(12) United States Patent
Morate et al.

(10) Patent No.: US 11,562,314 B2
(45) Date of Patent: Jan. 24, 2023

(54) INTERACTIVE PRODUCT AUDITING WITH A MOBILE DEVICE

(71) Applicant: The Nielsen Company (US), LLC, New York, NY (US)

(72) Inventors: Diego Garcia Morate, Valladolid (ES); Antonio Hurtado Garcia, Valladolid (ES)

(73) Assignee: The Nielsen Company (US), LLC, New York, NY (US)

( * ) Notice: Subject to any disclaimer, the term of this patent is extended or adjusted under 35 U.S.C. 154(b) by 132 days.

(21) Appl. No.: 17/062,159

(22) Filed: Oct. 2, 2020

(65) Prior Publication Data
US 2021/0073705 A1 Mar. 11, 2021

Related U.S. Application Data

(63) Continuation of application No. 14/894,901, filed as application No. PCT/IB2015/002064 on Sep. 30, 2015, now Pat. No. 10,796,262.

(51) Int. Cl.
*G06Q 10/06* (2012.01)
*G06Q 30/02* (2012.01)
(Continued)

(52) U.S. Cl.
CPC ..... *G06Q 10/06393* (2013.01); *G06Q 10/087* (2013.01); *G06Q 30/0242* (2013.01);
(Continued)

(58) Field of Classification Search
None
See application file for complete search history.

(56) References Cited

U.S. PATENT DOCUMENTS

| 4,373,133 A | 2/1983 | Clyne et al. |
| 4,973,952 A | 11/1990 | Malec et al. |

(Continued)

FOREIGN PATENT DOCUMENTS

| EP | 1798666 A1 | 6/2007 |
| EP | 2426623 A2 | 3/2012 |

(Continued)

OTHER PUBLICATIONS

European Patent Office, "Extended European Search Report," issued in connection with European Patent Application No. 15905278.6, dated Feb. 22, 2019, 9 pages.

(Continued)

*Primary Examiner* — Cory W Eskridge
(74) *Attorney, Agent, or Firm* — Hanley, Flight & Zimmerman

(57) ABSTRACT

Interactive product auditing with a mobile device is described. Example methods disclosed herein include performing, with an auditing device, image recognition based on a first set of candidate patterns accessed by the auditing device to identify a first product in a first region of interest of a segmented image. The disclosed example methods also include prompting, with the auditing device, a user to enter input associated with a first grid of the first region of interest displayed on a display, the first grid including the first product. The disclosed example methods further include determining, with the auditing device, a second set of candidate patterns to use to identify a second product in a second region of interest of the segmented image, the second set of candidate patterns determined based on the user input and a group of products identified in a neighborhood of the first region of interest.

27 Claims, 15 Drawing Sheets

(51) Int. Cl.
  *G06V 20/20* (2022.01)
  *G06V 20/52* (2022.01)
  *G06T 7/11* (2017.01)
  *G06Q 10/08* (2012.01)
  *G06F 3/0482* (2013.01)

(52) U.S. Cl.
  CPC ............ *G06T 7/11* (2017.01); *G06V 20/20* (2022.01); *G06V 20/52* (2022.01); *G06F 3/0482* (2013.01); *G06T 2200/24* (2013.01)

(56) References Cited

U.S. PATENT DOCUMENTS

| | | | |
|---|---|---|---|
| 5,287,266 A | 2/1994 | Malec et al. | |
| 5,294,781 A | 3/1994 | Takahashi et al. | |
| 5,640,002 A | 6/1997 | Ruppert et al. | |
| 5,699,244 A | 12/1997 | Clark, Jr. et al. | |
| 5,821,513 A | 10/1998 | OHagan et al. | |
| 6,026,376 A | 2/2000 | Kenney | |
| 6,026,377 A | 2/2000 | Burke | |
| 6,281,874 B1 | 8/2001 | Sivan et al. | |
| 6,304,284 B1 | 10/2001 | Dunton et al. | |
| 6,304,855 B1 | 10/2001 | Burke | |
| 6,381,510 B1 | 4/2002 | Amidhozour et al. | |
| 6,574,614 B1 | 6/2003 | Kesel | |
| 6,577,346 B1 | 6/2003 | Perlman | |
| 6,584,375 B2 | 6/2003 | Bancroft et al. | |
| 6,633,651 B1 | 10/2003 | Hirzalla et al. | |
| 6,708,156 B1 | 3/2004 | Gonten | |
| 6,911,908 B1 | 6/2005 | Beart | |
| 6,928,343 B2 | 8/2005 | Cato | |
| 7,064,783 B2 | 6/2006 | Colavin et al. | |
| 7,080,061 B2 | 7/2006 | Kabala | |
| 7,148,803 B2 | 12/2006 | Bandy et al. | |
| 7,155,336 B2 | 12/2006 | Dorfman et al. | |
| 7,164,780 B2 | 1/2007 | Brundage et al. | |
| 7,206,753 B2 | 4/2007 | Bancroft et al. | |
| 7,353,188 B2 | 4/2008 | Yim et al. | |
| 7,412,427 B2 | 8/2008 | Zitnick et al. | |
| 7,420,464 B2 | 9/2008 | Fitzgerald et al. | |
| 7,561,192 B2 | 7/2009 | Kobayashi | |
| 7,575,171 B2 | 8/2009 | Lev | |
| 7,681,796 B2 | 3/2010 | Cato et al. | |
| 7,751,805 B2 | 7/2010 | Neven et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,260,689 B2 | 9/2012 | Dollens | |
| 8,339,451 B2 | 12/2012 | Wang et al. | |
| 8,429,004 B2 | 4/2013 | Hamilton et al. | |
| 8,433,142 B2 | 4/2013 | Deng | |
| 8,447,863 B1 | 5/2013 | Francis, Jr. et al. | |
| 8,605,141 B2 | 12/2013 | Dialameh et al. | |
| 8,630,924 B2 | 1/2014 | Groenevelt et al. | |
| 8,694,459 B2 | 4/2014 | Zadeh | |
| 8,908,903 B2 | 12/2014 | Deng et al. | |
| 8,917,902 B2 | 12/2014 | Hicks | |
| 9,135,491 B2 | 9/2015 | Morandi et al. | |
| 10,366,306 B1 | 7/2019 | Raghavan et al. | |
| 10,796,262 B2 * | 10/2020 | Morate | G06Q 10/087 |
| 2002/0007295 A1 | 1/2002 | Kenny et al. | |
| 2002/0010655 A1 | 1/2002 | Kjallstrom | |
| 2002/0049687 A1 | 4/2002 | Helsper et al. | |
| 2003/0055707 A1 | 3/2003 | Busche et al. | |
| 2003/0187677 A1 | 10/2003 | Malireddy et al. | |
| 2004/0012631 A1 | 1/2004 | Skorski | |
| 2004/0224703 A1 | 11/2004 | Takaki et al. | |
| 2005/0035198 A1 | 2/2005 | Wilensky | |
| 2005/0111723 A1 | 5/2005 | Hannigan et al. | |
| 2006/0010030 A1 | 1/2006 | Sorensen | |
| 2006/0153296 A1 | 7/2006 | Deng | |
| 2006/0237532 A1 | 10/2006 | Scott-Leikach et al. | |
| 2007/0071038 A1 | 3/2007 | Mao | |
| 2008/0002893 A1 | 1/2008 | Vincent et al. | |
| 2008/0002914 A1 | 1/2008 | Vincent et al. | |
| 2008/0002916 A1 | 1/2008 | Vincent et al. | |
| 2008/0013801 A1 | 1/2008 | Reed et al. | |
| 2008/0068622 A1 | 3/2008 | Deng et al. | |
| 2008/0140478 A1 | 6/2008 | Goldberg et al. | |
| 2008/0170803 A1 | 7/2008 | Forutanpour | |
| 2008/0249867 A1 | 10/2008 | Angell et al. | |
| 2008/0306787 A1 | 12/2008 | Hamilton et al. | |
| 2009/0059270 A1 | 3/2009 | Opalach et al. | |
| 2009/0060349 A1 | 3/2009 | Linaker et al. | |
| 2009/0063306 A1 * | 3/2009 | Fano | G06Q 20/208 705/28 |
| 2009/0063307 A1 | 3/2009 | Groenovelt et al. | |
| 2009/0121017 A1 | 5/2009 | Cato et al. | |
| 2009/0123069 A1 | 5/2009 | Deng et al. | |
| 2009/0128644 A1 | 5/2009 | Camp, Jr. et al. | |
| 2009/0192921 A1 | 7/2009 | Hicks | |
| 2009/0240735 A1 | 9/2009 | Grandhi et al. | |
| 2010/0171826 A1 | 7/2010 | Hamilton et al. | |
| 2010/0214419 A1 | 8/2010 | Kaheel et al. | |
| 2011/0011936 A1 | 1/2011 | Morandi et al. | |
| 2011/0105194 A1 | 5/2011 | Wang et al. | |
| 2011/0184972 A1 | 7/2011 | Ard et al. | |
| 2011/0243459 A1 | 10/2011 | Deng | |
| 2013/0035984 A1 | 2/2013 | Davis et al. | |
| 2013/0051611 A1 | 2/2013 | Hicks | |
| 2013/0051667 A1 | 2/2013 | Deng et al. | |
| 2013/0265400 A1 | 10/2013 | Boncyk et al. | |
| 2014/0013193 A1 | 1/2014 | Selinger et al. | |
| 2014/0149376 A1 | 5/2014 | Kutaragi et al. | |
| 2014/0340394 A1 | 11/2014 | Mattila | |
| 2014/0340395 A1 | 11/2014 | Mattila | |
| 2015/0016712 A1 | 1/2015 | Rhoads et al. | |
| 2015/0039458 A1 | 2/2015 | Reid | |
| 2015/0086070 A1 | 3/2015 | Deng et al. | |
| 2015/0139555 A1 | 5/2015 | Jung et al. | |
| 2015/0235110 A1 | 8/2015 | Curtis et al. | |
| 2015/0317620 A1 | 11/2015 | Morandi et al. | |
| 2015/0339621 A1 * | 11/2015 | Hewett | G06Q 10/087 705/28 |
| 2016/0125265 A1 | 5/2016 | Xie et al. | |
| 2016/0180549 A1 * | 6/2016 | Shekar | G06T 7/11 382/103 |
| 2017/0255891 A1 | 9/2017 | Morate et al. | |
| 2018/0068180 A1 * | 3/2018 | Harary | G06V 30/248 |
| 2018/0330198 A1 * | 11/2018 | Harary | G06V 10/454 |

FOREIGN PATENT DOCUMENTS

| | | |
|---|---|---|
| EP | 3862948 | 8/2021 |
| JP | 2002312652 A | 10/2002 |
| WO | 2009027842 A2 | 3/2009 |
| WO | 2009111498 A2 | 9/2009 |

OTHER PUBLICATIONS

European Patent Office, "Extended European Search Report," issued in connection with European Patent Application No. 21162114.9, dated Apr. 30, 2021, 11 pages.

European Patent Office, "Decision to Refuse a European Patent Application," issued in connection with European Patent Application No. 15905278.6, dated Mar. 30, 2021, 17 pages.

International Searching Authority, "International Search Report and Written Opinion", issued in connection with International application No. PCT/IB2015/002064, dated Jul. 29, 2016 (16 pages).

Vanhemert, "Horizon App Solves the Dumbest Thing About Smartphone Video", retrieved from http://www.wired.com/2014/01/camera-app-solves-single-dumbest-thing-smart-phone-video/, Jan. 22, 2014 (9 pages).

Sudobility, "Night Camera", iTunes Preview, retrieved from https://itunes.apple.com/app/night-camera/d296186779, on May 12, 2015 (2 pages).

Store Eyes, Inc., "Store Eyes: Revolutionizing In-Store Compliance Monitoring", retrieved from www.storeeyes.com/Products)p2.html, 2010 (6 pages).

Azizyan et al., "SurroundSense: Mobile Phone Localization via Ambience Fingerprinting", Association for Computing Machinery, 2009 (12 pages).

(56) References Cited

OTHER PUBLICATIONS

"Product, Services, and Branding Strategy", Chapter 8, PowerPoint Presentation, retrieved from http://www.slideshare.net, on Jul. 30, 2011 (28 pages).
Barba, Ronald, "Can Slyce Take Down Amazon Flow in Image Recognition Shopping", Tech.Co, Apr. 7, 2014 (2 pages).
Leukel, Joerg, "Automating Product Classification: The Impact of Standardization", International Association for Development of the Information Society International Conference e-Society, 2004 (8 pages).
Mair et al., "Adaptive and Generic Corner Detection Based on the Accelerated Segment Test", Proceeding of the 11th European Conference on Computer Vision, Sep. 5-11, 2010 (14 pages).
Murdoch, Peter L., "Sentry Technology Signs LOI With Orions Digital", retrieved from http://finance.yahoo.com/news/Sentry-Technology-Signs-LOI-iw-2384033886.h- tmlx=O , on Jul. 30, 2011 (2 pages).
Probst et al., "Extracting and Using Attribute-Value Pairs from Product Descriptions on the Web", Spinger-Verlag, 2007 (20 pages).
Flowfinity, "White Paper: Improve Shelf Performance With a Mobile Retail Audit Solution", Flowtinity Wireless, Inc., 2011 (6 pages).
U.S. Appl. No. 14/796,813, filed Jul. 10, 2015 (92 pages).
U.S. Appl. No. 14/787,935, filed Aug. 31, 2015 (73 pages).
U.S. Appl. No. 14/530,129, filed Oct. 31, 2014 (71 pages).
United States Patent and Trademark Office, "Non-Final Office Action," issued in connection with U.S. Appl. No. 14/894,901, dated Apr. 9, 2019, 28 pages.
United States Patent and Trademark Office, "Final Office Action," issued in connection with U.S. Appl. No. 14/894,901, dated Sep. 3, 2019, 16 pages.
United States Patent and Trademark Office, "Notice of Allowance and Fee(s) Due," issued in connection with U.S. Appl. No. 14/894,901, dated Mar. 9, 2020, 18 pages.
European Patent Office, "Summons to attend oral proceedings pursuant to Rule 115(1) EPC," issued in connection with European Patent Application No. 15905278.6, mailed on Oct. 29, 2020, 12 pages.

\* cited by examiner

INTERACTIVE PRODUCT AUDITING WITH A MOBILE DEVICE

RELATED APPLICATIONS

This patent arises as a continuation of U.S. patent application Ser. No. 14/894,901, which was filed on Nov. 30, 2015, which is a national stage entry of International Patent Application No. PCT/IB2015/002064, which was filed on Sep. 30, 2015. The foregoing U.S. Patent Application and International Patent Application are hereby incorporated herein by reference in their entireties.

FIELD OF THE DISCLOSURE

This disclosure relates generally to product auditing and, more particularly, to interactive product auditing with a mobile device.

BACKGROUND

Shelf audits are typically performed by sending auditors to stores to collect information about different products in the stores. In some examples, shelf audits are completed by performing image recognition on point of sale images taken by the auditors. For example, retail establishments, product manufacturers, and/or other business establishments may take advantage of image recognition techniques performed on photographs taken in such establishments (e.g., pictures of product shelving) to identify quantities and/or types of products in inventory, to identify shelves that need to be restocked and/or the frequency with which products need restocking, to recognize and read product barcodes, to assess product arrangements and displays, etc. Image recognition may be used to identify consumer packaged goods displayed on store shelves. In some examples, image recognition applications or programs attempt to identify products depicted in images of a shelf taken at a point-of-sale. After the image recognition application or program has analyzed the point-of-sale image, an auditor manually reviews the results to verify the accuracy and/or make corrections. An auditor typically has to adjust or modify information in the results.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
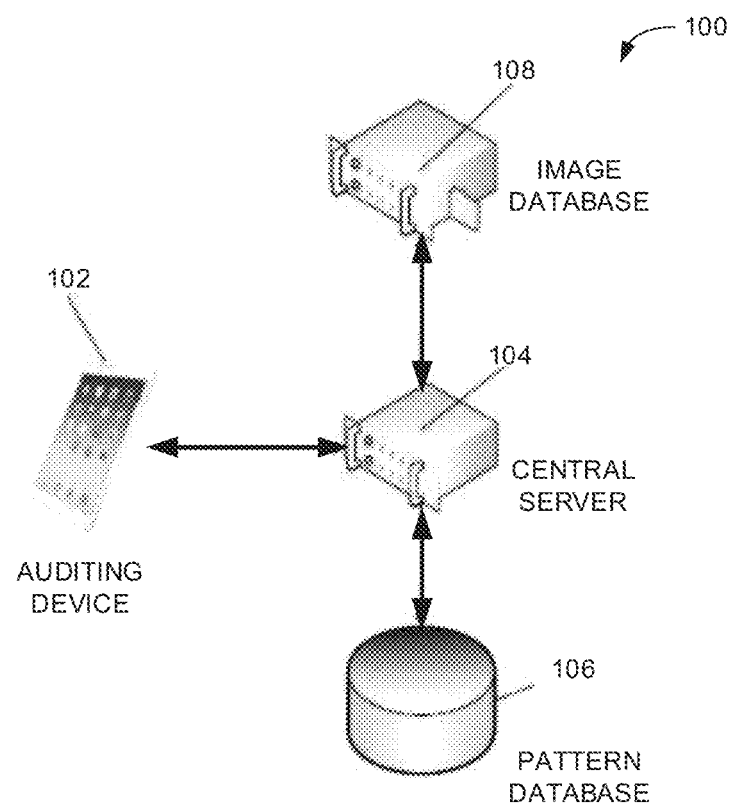
FIG. 1 is a block diagram of an example environment in which an example auditing device constructed in accordance with the teachings of this disclosure to perform interactive product auditing.

Manufacturers are interested in measuring effectiveness of product advertisements. In some examples, manufactures perform shelf audits to analyze how products are being sold in stores and to measure Key Performance Indicators (KPIs) that provide information related to the manners in which the products are presented in the stores and whether the stores are displaying the products according to the manufacturers' specifications. Typically, shelf auditing is a labor intensive and costly task. For example, in prior shelf audits, a sales representative visits each store and manually collects one or more variables related to the display of each product of interest. Such variables may include in-store location, number of facings, whether products holes are present, and whether products are out-of-stock. In some examples, collecting product information includes the sales representative manually scan barcodes for products that appears on the shelves, which is potentially time consuming. Furthermore, the quality of the data collected using such methods may be inaccurate.

In some examples, the audit data is collected using image recognition techniques, which allow the process to be partially automated. In some such examples, the sales representative's involvement in the audit is limited to taking pictures of the shelves that are to be audited. Using image recognition techniques is typically more accurate than having the sales representative manually scan barcodes to obtain information, but requires that the pictures be sent to a central location for processing. In some such examples, processing the images and verifying the results is performed by a human and is time consuming, inefficient, and costly.

Disclosed herein are example auditing methods, apparatus/systems, and articles of manufacture (e.g., physical storage media) that may be implemented to perform interactive product auditing with an auditing device using image recognition, thus improving the speed at which results are obtained, as well as the accuracy of the results. Interactive product auditing as disclosed herein can significantly reduce the turn-around time of receiving shelf audit results enabling the user to capture the point of sale image(s) and immediately view and modify results (e.g., which may include a segmented image created based on the point of sale image, Key Performance Indicators (KPIs), etc.) using the auditing device. Such interactive product auditing can increase the accuracy and efficiency of the results. For example, the user can fix errors in the results and/or immediately collect more information related to the products recognized in the point of sale image. Thus, in some examples, the results transmitted from the auditing device and obtained at the time of the in-store audit are the final results and do not require additional processing.

In examples disclosed herein, shelf auditing is completed using an example auditing application executed on the auditing device. The example auditing application includes a user interface that enables a user (e.g., the sales representative) to capture one or more point-of-sale images of a product shelf using a camera on the auditing device. In some examples, the auditing application analyzes the quality of the point of sale images and, if necessary, performs image stitching using the auditing device to create a single image from multiple point-of-sale images of the same product shelf. In some examples, a set of candidate patterns (e.g., a candidate pattern list) is used as a guide when performing the image recognition. In some such examples, the initial candidate pattern list is determined based on the store, a product type, and/or a user input, etc.

In some examples, the auditing application prompts the user, via the user interface, for an input related to the position (e.g., top, middle, or bottom) of a region of interest (e.g., each shelf). Based on the input from the user, the auditing device, in some examples, performs image recognition on the shelf individually and displays, via the user interface, the auditing results for the shelf to the user. The results may include, for example, a segmented image created from the point-of-sale image using image recognition techniques and KPIs indicating variables related to each product(s) depicted in the image. The segmented image includes, for example, a region of interest, a grid, a confidence level associated with each shelf, and an indication of whether the user reviewed the results for each shelf. The KPIs include, for example, respective shares of shelf space occupied by the different products, a task list for the user to complete, assortment compliance, etc. In some examples, the auditing application enables the user to modify the results in an interactive way, such as allowing the user to fix errors in the results, including errors in the segmented image and/or the KPIs. Errors can include, for example, a failure of the image recognition system to find a product in a particular location on the shelf, a misidentification of a product, a misidentification of one or more variables associated with the product (e.g., share of shelf, number of facings, etc.), etc.

In some examples, the interactive auditing application executed by the auditing device considers input(s) from the user related to a first region of interest (e.g., a first shelf) in the segmented image when performing image recognition on the remaining regions of interest (e.g., other shelves), thus increasing the accuracy of image recognition results for the subsequent shelves. For example, the candidate pattern list used to recognize products on subsequent shelves can be updated based on the input from the user and the products identified in relation to the first shelf. In some such examples, the input(s) from the user include a verification of products identified or a modification of the results due to an error in the recognition of the products. In some examples, the user verifies and/or modifies the results of each region of interest on the auditing device prior to transmitting the results to a server for view by a client. In such examples, the auditing device sends the results (e.g., segmented image, KPIs, etc.) and the point of sale images to a central server. In some examples, the auditing device performs the shelf audit without requiring an internet connection and later connects to the internet to transmit the results to the central server.

FIG. 1 is a block diagram of an example environment 100 in which an example auditing device 102, constructed in accordance with the teachings of this disclosure, operates to perform interactive audits of product shelves in a store. In the illustrated example, the auditing device 102 is a smartphone. However, in other examples, the auditing device 102 can be, for example, a mobile device, a tablet, a laptop computer, and/or any other suitable device. The example auditing device 102 is described in further detail in connection with FIG. 2 below.

The example environment 100 includes an example a central server 104 commutatively coupled to the auditing device 102 to synchronize information with the auditing device 102. In some examples, the example central server 104 communicates with the auditing device 102 via a wireless internet network. Additionally or alternatively, in some examples, the central server 104 communicates with the auditing device 102 using any other suitable communication protocol, including but not limited to, a cellular network, a data network, Bluetooth, Radio-Frequency Identification (RFID), Near Field Communication (NFC), or a wired internet connection, etc. In some examples, product shelf audit data and/or results are communicated between the central server 104 and the auditing device 102. For example, the central server 104, in some examples, transmits patterns and/or images to the auditing device 102. In some examples, the auditing device 102 transmits reported results (e.g., image-based results and/or KPIs) to the central server 104.

In the illustrated example, the example environment 100 includes an example pattern database 106 in communication with the central server 104 via any wired and/or wireless network. The example pattern database 106 includes, in some examples, patterns corresponding to products to be audited by the auditing device 102. In some examples, the auditing device 102 performs image recognition using the patterns (e.g., which may be reference images, graphics, etc., of products-of-interest) to match the patterns with products on the product shelf. In some examples, the example pattern database 106 communicates with the central server 104 to synchronize patterns to the auditing device 102. Additionally or alternatively, the auditing device 102 may be in direct communication with the pattern database 106. In some examples, the patterns are communicated to the auditing device 102 prior to the user arriving at a store to perform an audit. In such examples, the user is able to audit the products in the store without reconnecting to the central server 104 and/or the pattern database 106. In some examples, the auditing device 102 may be in communication (e.g., via a wireless network) with the central server 104 and/or the pattern database 106 while performing the product shelf audit in the store. In some examples, the auditing device 102 creates new a new pattern by identifying a product on the product shelf that does not match an existing pattern. In some such examples, the auditing device 102 communicates the new pattern to the central server 104 and/or the pattern database 106. In some examples, the example pattern database 106 is implemented by a server. Additionally or alternatively, the pattern database 106 can be implemented by, for example, a mass storage device, such as a hard drive, a flash disk, a flash drive, etc.

In some examples, the illustrated example environment 100 includes an image database 108. In some examples, the central server 104 is in communication with the image database 108 via a wired and/or wireless network. In some examples, the example central server 104 synchronizes data and/or images between the example image database 108 and the example auditing device 102. Additionally or alternatively, in some examples, the auditing device 102 is in direct communication with the image database 108. In some examples, the auditing device 102 transmits reported image-based results and/or point of sale images to the central server 104 and/or the image database 108. In some such examples, the central server 104 communicates the image-based results and/or point of sale images to the central server 104 and/or the image database 108. In some examples, the auditing device 102 transmits the image-based results and/or the point of sale images immediately after obtaining the image-based results and/or the point of sale images. In other examples, the auditing device 102 delays transmittal of the image-based results and/or the point of sale images until the auditing device 102 is in communication with the central server 104 via a network connection (e.g., such as a wireless and/or wired Internet connection). In some examples, the image database 108 transmits point of sale images to the auditing device 102 and/or the central server 104. In some examples, the image database 108 is in communication with the central server 104, the auditing device 102, and/or the pattern database 106 via any wired or wireless connection. In some examples, the example image database 108 is implemented by a server. Additionally or alternatively, the image database 108 can be implemented by, for example, a mass storage device, such as a hard drive, a flash disk, a flash drive, etc.

Figure 2:
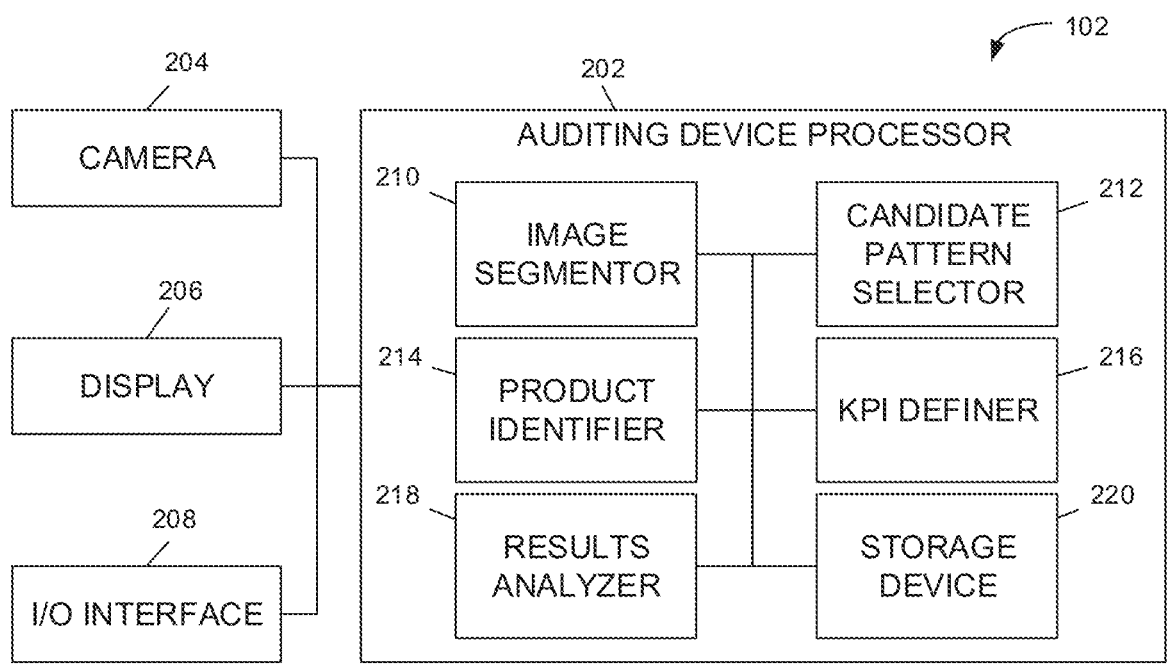
FIG. 2 is a block diagram of an example implementation implemented by the auditing device of FIG. 1.

FIG. 2 is a block diagram of an example implementation of the auditing device 102 of FIG. 1. In some examples, the example auditing device 102 includes an example auditing device processor 202 structured to enable the auditing device to perform a product shelf audit interactively. In some such examples, the processor 202 is operatively coupled to additional components of the auditing device 102, such as an example camera 204, an example display 206, and/or an input/output (I/O) and/or other communication interface 208.

In the illustrated example, the auditing device 102 includes the example camera 204 operatively coupled to the processor 202. In some examples, the camera 204 captures point of sale image(s) of a region of interest (e.g., a product shelf) and communicates the image(s) to the processor 202. In some examples, the camera 204 is capable of scanning barcodes to provide additional input related to the products in the point of sale image(s), and may communicate the barcodes to the processor 202.

The example auditing device 102 of the illustrated example includes an example display 206 operatively coupled to the processor 202. The display 206, in some examples, presents results to the user via a user interface (e.g., an interactive and/or graphical user interface) implemented by the example processor 202 of the auditing device 102. In some examples, the display 206 is a touchscreen to simplify interaction between the auditing device 102 and the user when providing input related to the displayed results. In some examples, the user provides input in response to prompts on the display 206 communicated via the user interface. In some examples, the user provides input to correct errors in the results presented to the user on the display 206 via the user interface. FIGS. 3-12 depict example representations of the user interface that may be implemented by the example processor 202 using the example display 206 on the example auditing device 102.

In some examples, the auditing device 102 includes an example input/output (I/O) interface 208 operatively coupled to the processor 202. The I/O interface 208 is operative to communicate with, in some examples, the central server 104, the pattern database 106, and/or the image database 108 of FIG. 1. In some examples, the I/O interface 208 is operative to interactively communicate with the user using, for example, the display 206, a button on the auditing device, a voice command, a gesture, a sensor to receive input from the user, etc. In some such examples, the I/O interface 208 enables the user to provide input to the user interface, via the display 206, related to the products on the region of interest (e.g., the product shelf) and/or the results displayed to the user.

An example implementation of the processor 202 of the example auditing device 102 is also depicted in FIG. 2. In some examples, the example processor 202 of the auditing device 102 includes an example image segmentor 210. In some examples, the example image segmentor 210 of the processor 202 receives the point of sale images from the camera 204. In some examples where multiple point of sale image are captured for a product shelf being evaluated, the image segmentor 210 performs image stitching to combine the multiple images to create a single image corresponding to the product shelf. An example image stitching process that may be used in connection with the example image segmentor 210 disclosed herein is described in detail in International Patent Application No. PCT/IB2015/001103, formerly International Application No. PCT/ES2015/000078 (International Patent Publication No. WO2016203282A1), titled Methods and Apparatus to Capture Photographs Using Mobile Devices, and filed on Jun. 18, 2015, which is hereby incorporated by reference in its entirety.

Figure 3:
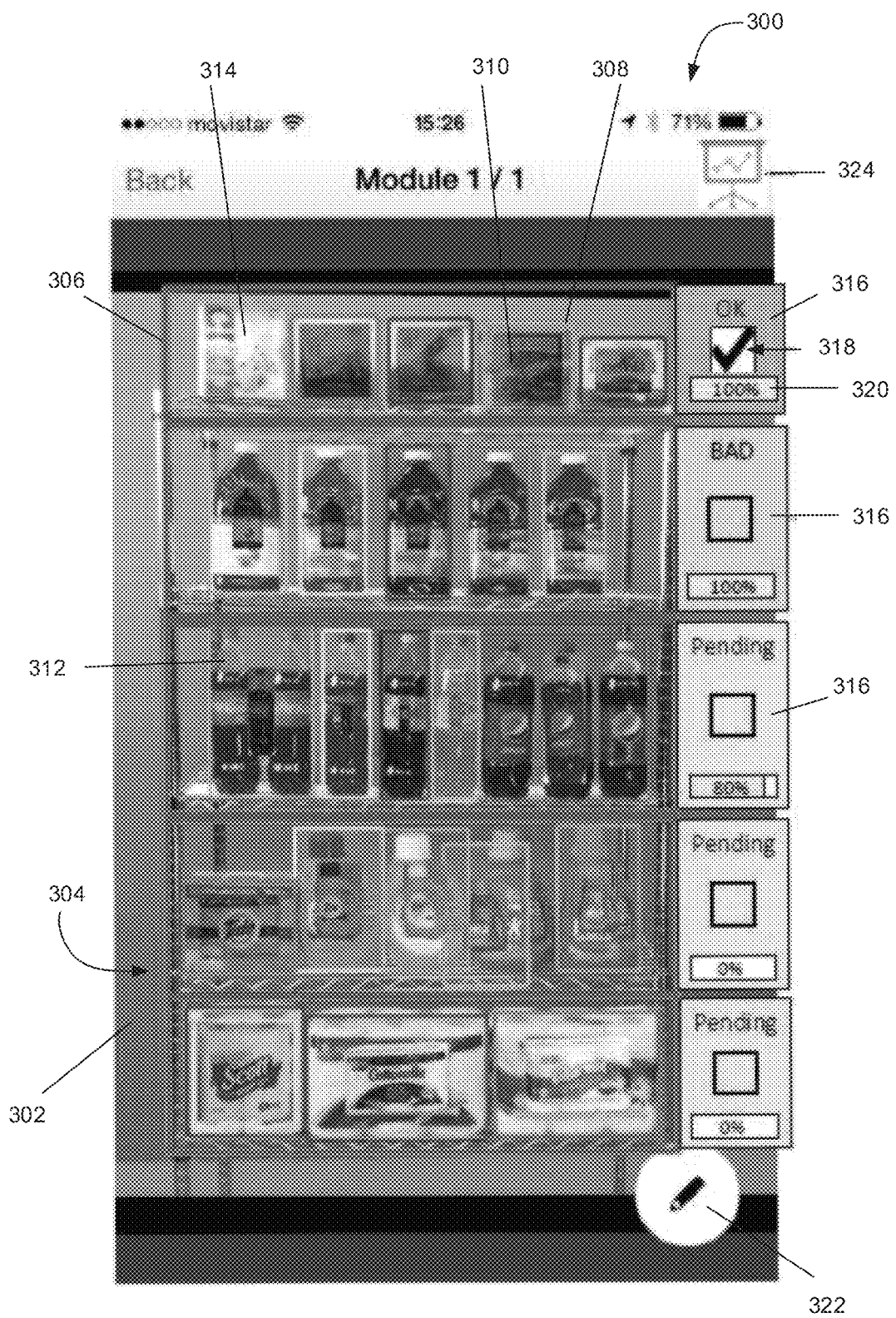
FIGS. 3-12 are example implementations of a user interface on the auditing device of FIGS. 1 and/or 2 to perform interactive product auditing.

In some examples, the image segmentor 210 defines segments in the image that may contain products to be identified. In some examples, the image segmentor 210 designates the locations of the segments in a segmented image by defining shapes (e.g., rectangles/boxes, etc.) around the segments and/or products. As used herein, the term "segmented image" refers to a point of sale image that has been segmented by the image segmentor 210, and when displayed, the segmented image includes, for example, the image content of the original image and the shapes (e.g., rectangles/boxes, etc.) defining the products identified in the image. In some examples, the segmented image is displayed as a portion of the results (e.g., the image-based results) via the user interface and the display 206. In some such examples, the image segmentor 210 displays the segmented image to the user via the user interface to enable a user to verify that the image is properly segmented and/or correct errors in the segmented image. In some examples, the user designates segments to be added to the segmented image when reviewing and interacting with the results using the user interface on the display 206 of the auditing device 102. In some such examples, the user interface of the auditing device 102 prompts the user to define and/or redefine the segments in the segmented image. In other such examples, the user defines additional segments and/or redefines existing segments to correct segmentation error(s) made by the image segmentor 210. For example, a segmentation error includes failing to create a segment for a product on the shelf that is to be identified, creating a segment where there is no product to be identified, creating a segment including too many products to be identified, etc. In some examples, a segment is created where there is no product on the shelf, which may correspond to an out-of-stock product expected (e.g., based on stored/retrieved information from prior audit results) to be in that location on the shelf. An example image-based result including a segmented image designating example segments using boxes is shown in FIG. 3, which includes an example depiction of an example image based result 300 displayed by the example user interface implemented by the example processor 202.

In some examples, the segments defined by the image segmentor 210 include regions of interest. The regions of interest, in some examples, correspond to shelves (e.g., shelves of a product shelving unit) identified in the image of the product shelving unit. Examples of such regions of interest corresponding to shelves are designated by, for example, box 306 of FIG. 3. Additionally or alternatively, in some examples, the regions of interest correspond to an entire product shelving unit, a product type, an individual product, and/or any other area in the point of sale image designated by the user as a region of interest. As used here, the term "product shelving unit" refers to a section of store shelving that includes multiple shelves, the terms "shelf" and/or "shelves" refer to individual shelves of the product shelving unit, the term "product type" refers to products on the product shelving unit and/or a shelf that are identified as the same product, and the term "individual product" refers to each product on the product shelving unit and/or a shelf, regardless of product type.

In some examples, the segments defined by the image segmentor 210 include grids. In some examples, the girds correspond to a product type (e.g., multiple instances of an individual product of the same product type are included in the grid). Examples of grids corresponding to the product type are depicted by, for example, box 308 of FIG. 3. Additionally or alternatively, in other examples, the grids correspond to the product shelving unit, a shelf, or an individual product.

In some examples, the processor 202 includes an example candidate pattern selector 212. The example candidate pattern selector 212, in some examples, communicates with the pattern database 106 to download patterns from the pattern database 106 to the auditing device 102. A pattern, in some examples, includes a reference image of a product, a graphical representation of a product, logos/brand information depicted on product packaging, etc. In some examples, the candidate pattern selector 212 selects patterns to download (e.g., downloaded patterns) based on a store and/or a type of store being audited and/or a user performing the audit. In some such examples, the candidate pattern selector 212 selects and downloads the downloaded patterns to the auditing device 102 prior to the user beginning the shelf audit. In some examples, the candidate pattern selector 212 selects and downloads the downloaded patterns after the audit is initialized. In some examples, the candidate pattern selector 212 selects a first set of patterns (e.g., a first candidate pattern list) from the downloaded patterns to be used by an example product identifier 214 (described in further detail below) to evaluate a first region of interest (e.g., a first product shelf). In some such examples, the first set of patterns is selected from the downloaded patterns based on a product type or a store type associated with the product shelf being evaluated. In some such examples, the product type is designated by an input from a user via the user interface.

In some examples, in response to a verification of the products identified by the product identifier 214 in the first region of interest, the candidate pattern selector 212 receives an indication of the patterns used by the product identifier 214 during the evaluation of the first region of interest and/or an indication of the patterns matching products in the first region of interest. In some such examples, the candidate pattern selector 212 selects, based on the first set of patterns and/or the received indication(s) of the patterns associated with the first region of interest, a second set of patterns (e.g., a second candidate pattern list) to be used by the product identifier 214 to evaluate a second region of interest in the segmented image. In some such examples, the candidate pattern selector 212 determines a neighborhood of the products identified in the first region of interest to assist in choosing the second set of patterns. In some examples, the neighborhood for a given product includes products (and/or grids of products) immediately adjacent to and/or within a particular number of grids away from the given product identified in the first region of interest. In some examples, the neighborhood of a given product identified in the first region of interest includes the products identified in the first region of interest, other products identified in the product shelf containing the given product, other products identified in verified regions of interest of the segmented image, and/or products identified in unverified regions of interest of the segmented image. In some examples, the candidate pattern selector 212 chooses the second set of patterns based on one or more of a product category, a category level, a store, etc. In some such examples, the product category, the category level, or the store may be determined from the segmented image and/or based on a user input. In some examples, the candidate pattern selector 212 chooses a new set of patterns to be used to evaluate different regions of interest in the segmented image. For example, if the segmented image includes five regions of interest, the candidate pattern selector 212 may select a new set of patterns after each of the regions of interest in the segmented image is verified. In some such examples, the candidate pattern selector 212 evaluates information related to the products identified in verified region(s) of interest to select the new set of patterns used to evaluate a subsequent region of interest.

In some examples, the example product identifier 214 of the processor 202 uses image recognition techniques to identify products in, for example, a region of interest of a segmented image, a grid of the segmented image, etc. In some examples, the product identifier 214 compares the products in the region(s) of interest and/or the grid(s) to the respective set of patterns obtained for that region/grid (e.g., the first set of patterns is used for the first region of interest, the second set of patterns is used for the second region of interest, etc.). For example, to evaluate the products in a first region of interest, the product identifier 214 of the illustrated example compares the products to the first set of patterns to find a pattern that matches a product in the first region of interest. In some examples, a product that matches a pattern is referred to as an identified product. In some examples, the product identifier 214 displays the identified product in the corresponding grid of the segmented image for verification by the user. An example identified product matching a pattern 310 is shown in the example image-based results 300 of FIG. 3. In some examples, the product identifier identifies an out-of-stock product in a segment (e.g., which has no product) based on audit information stored and/or retrieved for a prior audit of the shelving unit and identifying a product previously located in the shelving unit. In some such examples, the product identifier identifies a type of product that is out-of-stock.

In some examples, the product identifier 214 identifies some or all of the products in a region of interest and/or a product shelf prior to displaying the identified products to the user in the segmented image via the user interface. In some such examples, the product identifier 214 determines a confidence level indicating the certainty that the products identified in the region of interest are accurate. In some examples, the confidence level is determined as described in, for example, International Patent Application No. PCT/IB2015/001844, formerly International Patent Application No. PCT/ES2015/000119 (International Patent Publication No. WO2017037493A1), titled Product Auditing in Point of Sale Images and filed on Aug. 31, 2015, which is hereby incorporated by reference in its entirety. In some examples, the product identifier 214 displays the confidence level in the region of interest in the segmented image via the user interface. In some examples, the product identifier 214 prompts the user to verify, via the user interface, that the identified product is correct and/or to select a correct product to replace the identified product via the user interface. In some examples when the product identifier 214 identifies a product, the product identifier 214 also displays other potential matches for the product, via the user interface, and prompts the user to select the correct product to be the identified product, one of the other displayed potential matches or a different product entered by the user. In some such examples, if the potential matches are not the correct product, the user may use the camera 204 to scan the barcode of the product and/or may enter the product information manually. In some examples, if a product in the region of interest does not match any patterns, the product identifier 214 creates a new pattern corresponding to that product using information entered by the user. In some such examples, the new pattern is communicated to the pattern database 106.

In some examples, the processor includes an example key performance indicator (KPI) definer 216. In some examples, the example KPI definer 216 computes key performance indicators (KPIs) based on the shelf audit. In some examples, the KPI definer 216 receives information related to the identified products (e.g., facings (e.g., a side(s) of the product facing outward from the shelf), location, assortments, share of shelf, etc.). In some examples, the KPI definer 216 computes the number of products (e.g., the total number of products and/or the number of each type of product). In some examples, the KPI definer 216 computes metric information (e.g., dimensions of the product) related to the products on a product shelf. In some examples, the KPI definer 216 compiles information (e.g., computed information and/or received information) related to the product shelf audit. In some such examples, the KPI definer 216 determines the output KPIs based on the information. In some examples, the KPI definer 216 compares the output KPIs to target KPIs. In some such examples, the target KPIs are pre-defined and/or designated by the user prior to the audit. In some examples, the output KPIs are transmitted to the central server 104. In some such examples, the output KPIs are queued for transmission to the central server 104 when the auditing device 102 is connected via a network connection.

Figure 7:
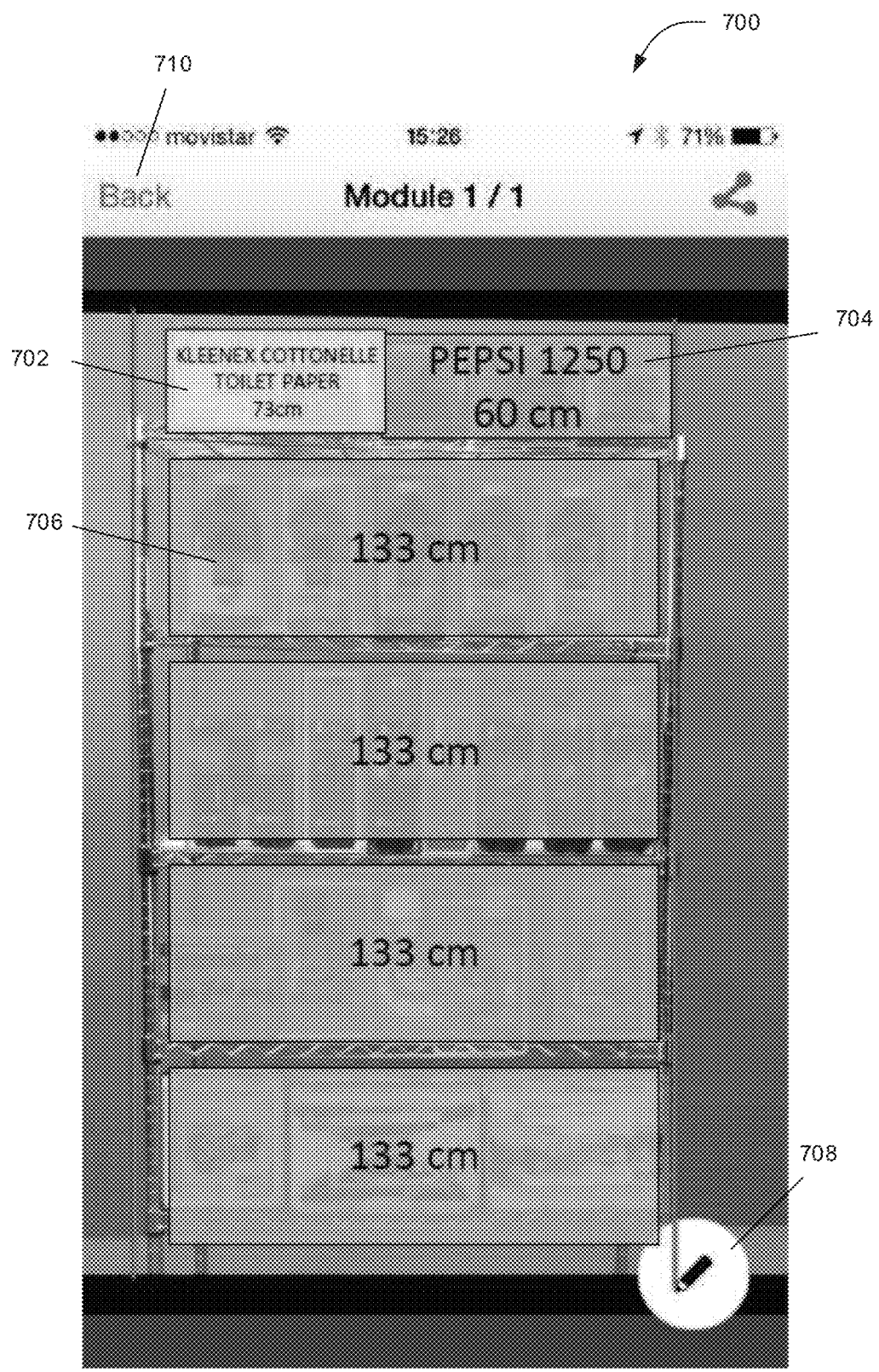
Figure 8:
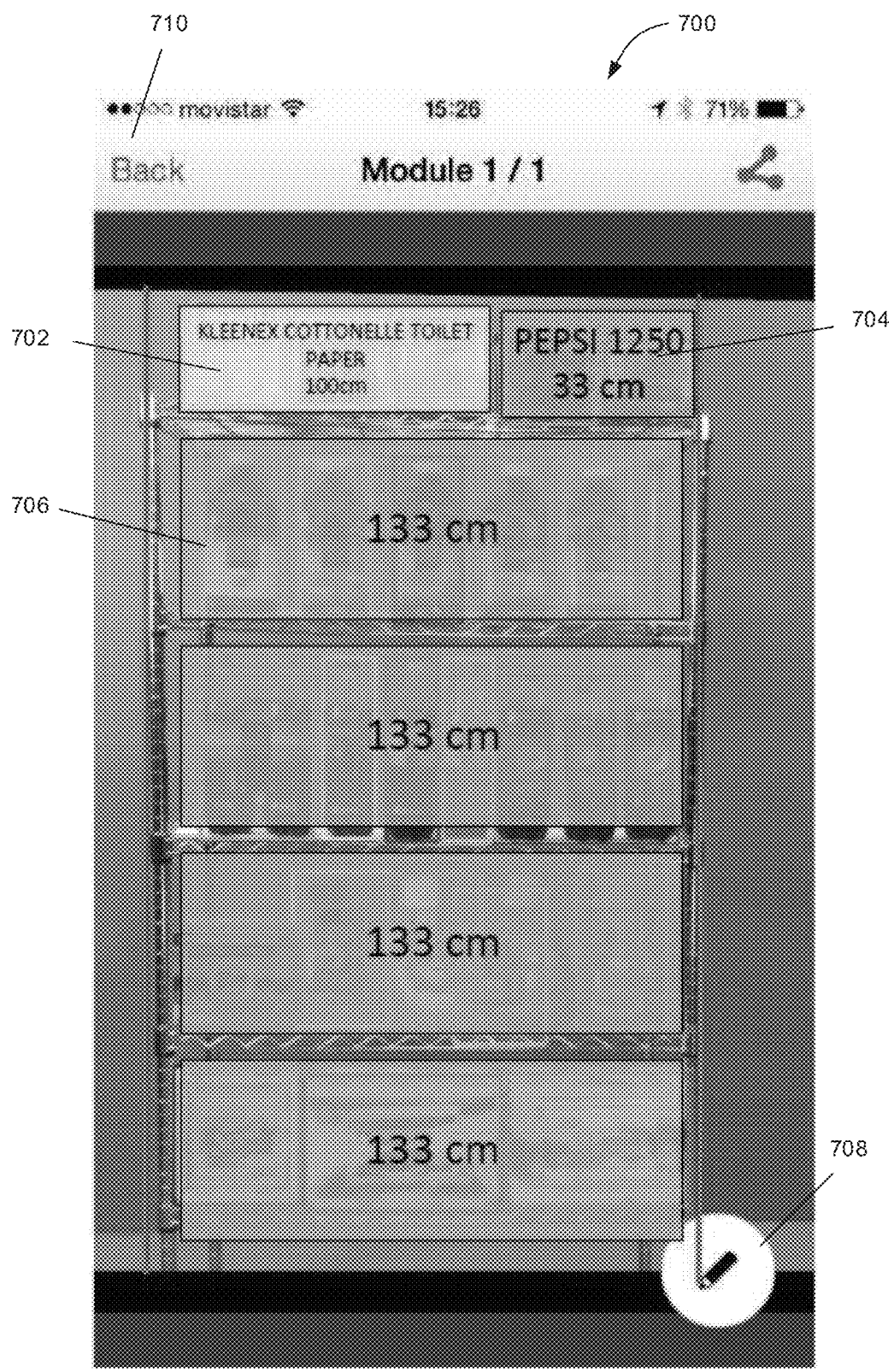

In some examples, the KPI definer 216 creates a to-do list including tasks to be completed by the user. In some examples, the KPIs are displayed by the user interface based on the type of KPI (e.g., tasks, assortment, share of shelf, promotions, prices, and position). For example, FIGS. 4-6 and 9-11 illustrate example depictions of the KPIs displayed in lists via the user interface of the auditing device 102. In some examples, the KPIs are modifiable using the lists displayed via the user interface. In some such examples, the KPI definer 216 prompts the user to edit the KPIs. For example, in FIG. 5, a user may select the value 506 corresponding to the number of each product on the shelf and changes the value. In some such examples, changing the value 506 also updates the percentage value 508 corresponding the product. In some examples, some KPIs, such as the share of shelf and position KPIs, include an image-based KPI result in the user interface of the auditing device 102 (as shown in FIGS. 7, 8, and 12). In some such examples, the KPIs are modifiable using either the listed KPI results display or the corresponding image-based KPI results display.

In some examples, the processor 202 includes an example results analyzer 218. The example results analyzer 218, evaluates the segmented image and/or the image based results to determine whether the product identifier 214 has completed evaluation of the regions of interest or grids of the segmented images and/or the image-based results. In some examples, the results analyzer 218 determines if the user has verified all of the regions of interest and/or grids in the segmented image and/or the image-based results. In some examples, the results analyzer 218 additionally or alternatively determines if any KPIs are to be evaluated by the user and/or whether the user is to provide additional input based on the KPIs. In some examples, the results analyzer 218 communicates with the central server 104, via the I/O interface 208, to transmit the final results to the central server 104.

In some examples, the processor 202 includes an example storage device 220. In some examples, the storage device 220 is in communication with the example image segmentor 210, the example candidate pattern selector 212, the example product identifier 214, the example KPI definer 216, the example results analyzer 218, the camera 204, the display 206, and/or the I/O interface 208. In some examples, the camera 204 communicates images (e.g., point of sale images captured by the user) to the storage device 220 for later transmittal to the central server 104. In some examples, the image segmentor 210 receives the point-of-sale images from the storage device 220. In other examples, the image segmentor 210 stores a segmented image in the storage device 220 for later evaluation and/or later transmittal to the central server 104. In some examples, the candidate pattern selector 212 downloads patterns from the pattern database 106 to the storage device 220 and/or retrieves patterns from the storage device 220 to create candidate pattern lists. In some examples, the product identifier 214 stores image-based results (e.g., results not yet verified) to be presented to the user in the storage device 220. In some examples, the KPI definer 216 stores target KPIs and/or output KPIs in the storage device 220. In some examples, the results analyzer 218 stores final results (image-based results and/or KPIs) in the storage device 220 for transmittal to the central server 104.

FIG. 3 is an example image-based result 300 viewable in an example user interface implemented by the auditing device 102 of FIGS. 1 and/or 2 for interactive product auditing. The example image-based result 300 is created using an example point-of-sale image 302, which is a background layer in the illustrated example. In the illustrated example, the image-based result 300 depicts a product shelving unit 304 including one or more regions of interest 306. In some examples, a region of interest 306 includes one or more grids 308. In the example image-based result 300, a displayed grid 308 includes a candidate pattern 310 matched to the product(s) in the grid 308. In some examples, the grid 308 includes more than one instance of an individual product 312. In some examples, the image-based result 300 includes an error, such as a product 314 that has not been properly segmented. In some examples, the image-based result 300 includes an indicator 316 indicating whether the user has reviewed the region of interest 306. In some such examples, when the user has verified the products region of interest 306 are correctly identified, the indicator 316 includes a signifier 318 (e.g., a check mark) that the user has approved the region of interest 306. In some such examples, when the user has not reviewed the region of interest 306, the indicator 316 signifies that the region of interest 306 is not reviewed. In some examples, when the region of interest 306 has not been evaluated, the indicator 316 signifies that the region of interest 306 is pending evaluation. In some examples, the indicators 316 include respective confidence levels 320. In some examples, the image-based result 300 includes an edit button 322 to enable the user to edit the image-based result 300. In some examples, the image-based result 300 includes a KPI button 324 that, when selected, displays a KPI viewer in the user interface.

Figure 4:
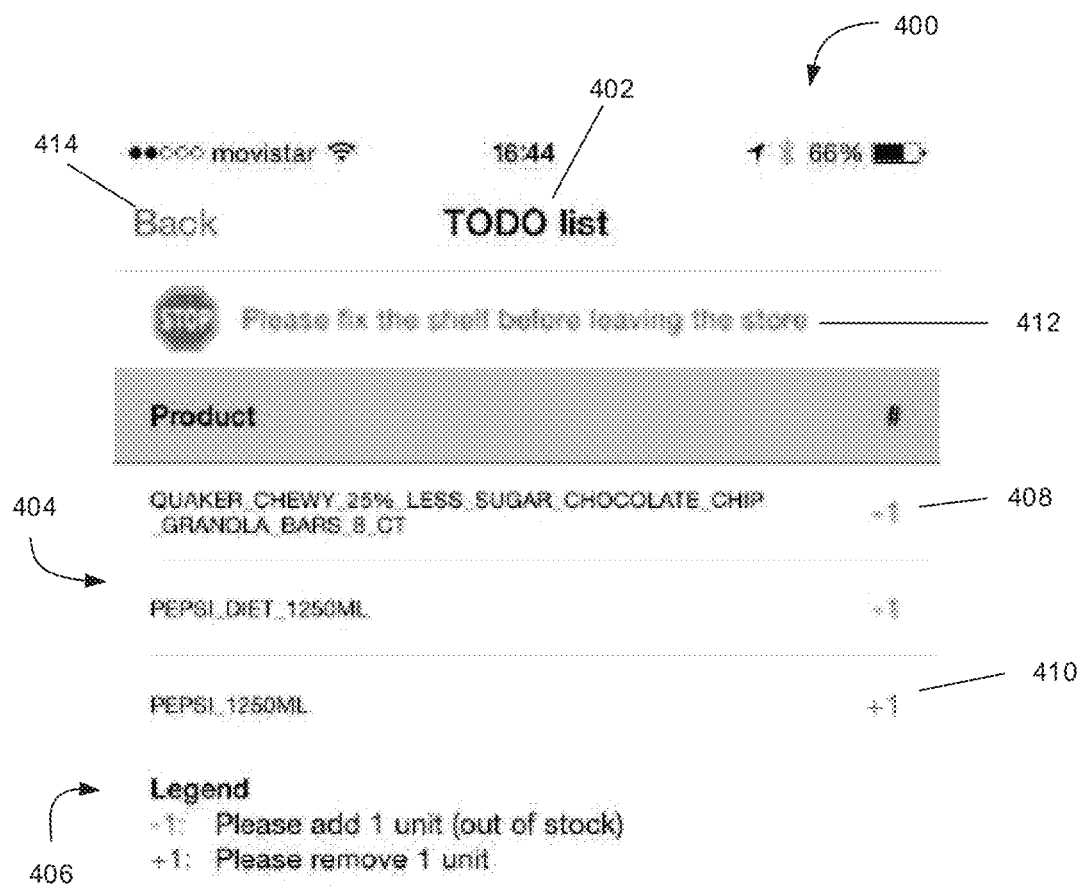

FIG. 4 is an example to-do list KPI 400 viewable in an example user interface implemented by the auditing device 102 of FIGS. 1 and/or 2. In some examples, the to-do list KPI 400 includes a title 402 to indicate which KPI the user is viewing. The example to-do list KPI 400 includes a list of products 404 related to tasks to be performed by the user. In some examples, the to-do list KPI 400 includes a legend 406 to provide instructions to the user related to the tasks. In the illustrated example, a product in the list includes an indicator 408 (e.g., "−1") indicating that the user is to add an indicated number of units (e.g., one unit) of the product to the shelf. In the illustrated example, another product in the list includes an indicator 410 (e.g., "+1") indicating that the user is to remove an indicated number of units (e.g., one unit) of the product to the shelf. In some examples, the to-do list KPI includes a warning 412 to indicate that the user needs to complete one or more tasks before leaving the store. In some examples, the to-do list KPI 400 includes a back button 414 to return the user to the previous view in the user interface.

Figure 5:
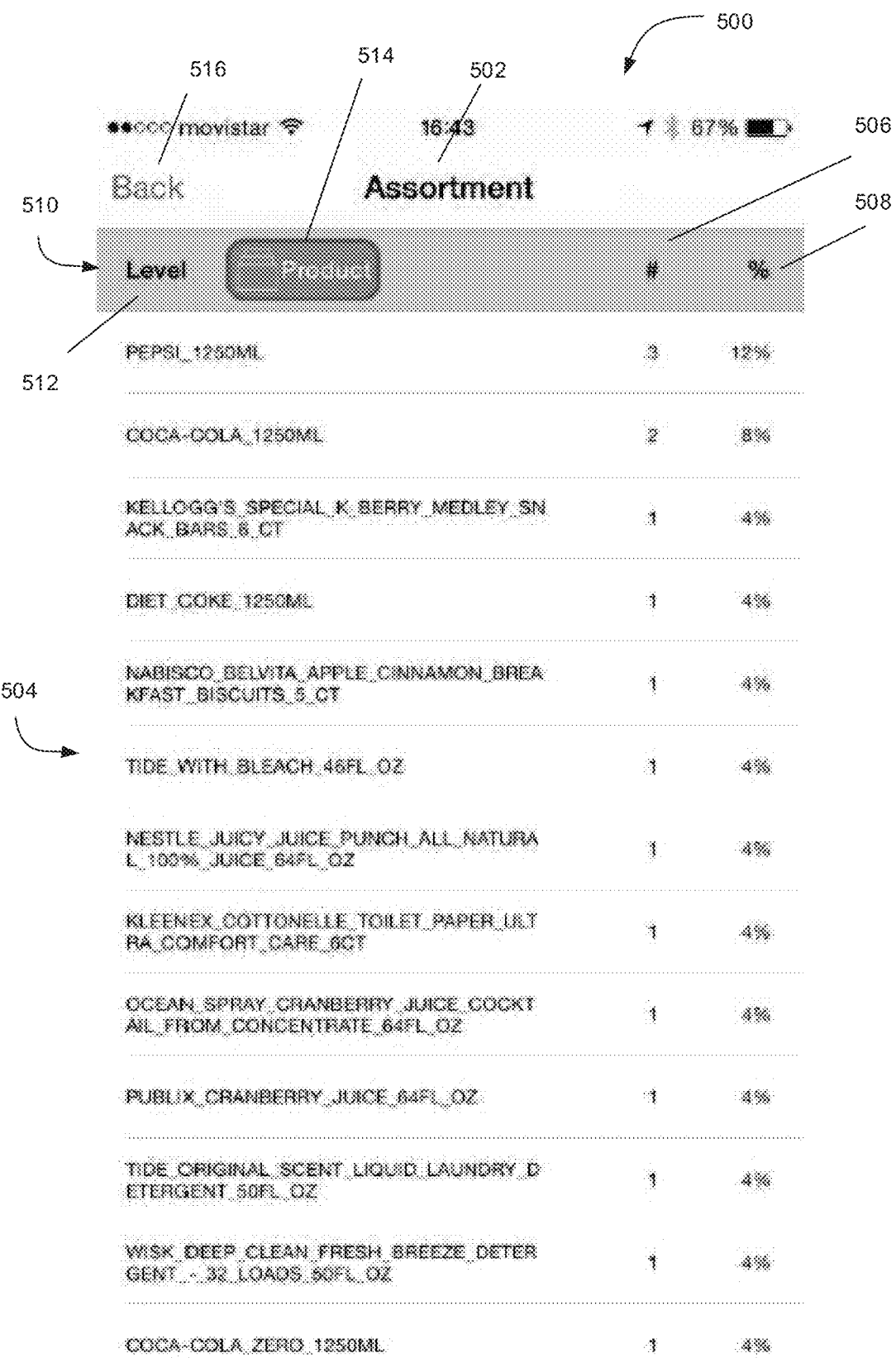

FIG. 5 is an example assortment KPI 500 viewable in an example user interface implemented by the auditing device 102 of FIGS. 1 and/or 2. In some examples, the assortment KPI 500 includes a title 502 to indicate which KPI the user is viewing. The example assortment KPI 500 includes a list of products 504 including a number of units 506 for each product and a percentage 508 of the units identified in the shelving unit being audited. In some examples, the percentage 508 is based on the number of units 506 of the product that are on the example product shelving unit 304 of FIG. 3. In some examples, the user may change the number of product units 506 by selecting the number of units 506 and using a pop-up input window (e.g., a keyboard) to adjust the number of units 506. In some examples, the assortment KPI 500 includes one or more view-switching buttons 510. In the illustrated example, the view switching buttons 510 include a level button 512 and a product button 514. In some examples, the level view displays the products based on the region of interest (e.g., shelf) in which the product is located. In some examples, the product view, as illustrated in the example assortment KPI 500, displays the products in a defined order (e.g., by products having the most units). In some examples, the assortment KPI 500 includes a back button 516 to return the user to the previous view in the user interface.

Figure 6:
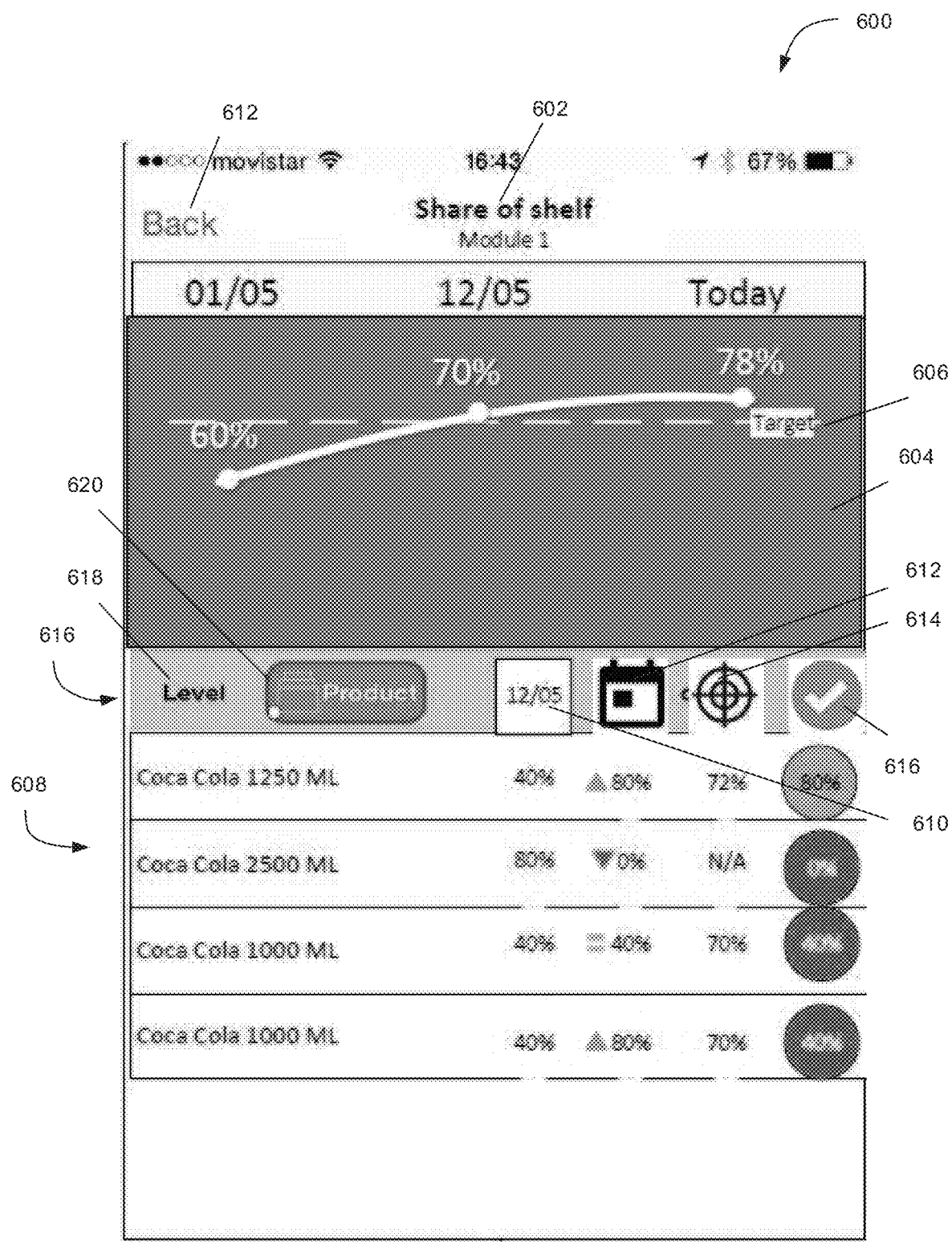

FIG. 6 is an example share of shelf KPI 600 viewable in an example user interface implemented by the auditing device 102 of FIGS. 1 and/or 2. In some examples, the share of shelf KPI 600 includes a title 602 to indicate which KPI the user is viewing. In some examples, the share of shelf KPI 600 includes a graph 604 representing the share of shelf occupied by specified product over time. In the illustrated example, the graph 604 includes entries based on a monthly basis. In some examples, the share of shelf for a product is visually compared to a target share of shelf 606 using the graph 604. In some examples, the share of shelf KPI 600 includes a list of products 608 associated with the graph. In some examples, the share of shelf KPI 600 displays the share of shelf measured during the last visit in a first column 610. In some examples, the share of shelf measured during the current audit is displayed in the second column 612 of the share of shelf KPI 600. In some examples, a target share of shelf (e.g., within a tolerance, which may be the same or different for different products) is displayed in the third column 614. In some examples, an indicator of whether the measured share of shelf meets the target share of shelf is displayed in a fourth column 616. In some examples, the user can change the share of shelf values (e.g., the measured share of shelf from the current audit 612, the target share of shelf 614) by clicking on the values and using a pop-up window to enter a new share of shelf value. In some examples, the share of shelf KPI 600 includes one or more view-switching buttons 616. In the illustrated example, the view switching buttons 616 include a level button 618 and a product button 620. In some examples, the share of shelf KPI 600 includes a back button 622 to return the user to the previous view in the user interface.

FIGS. 7 and 8 depict an example share of shelf image-based KPI 700 viewable in an example user interface implemented by the auditing device 102 of FIGS. 1 and/or 2. In some examples, the share of shelf image-based KPI 700 is displayed to the user to enable the user to change the share of shelf of one or more products identified in the product shelving unit 304 of FIG. 3. For example, in the illustrated share of shelf image-based KPI 700, the share of shelf for Kleenex Cottonelle® Toilet Paper 702 is changed from 73 cm in FIG. 7 to 100 cm in FIG. 8. In response to the change of the share of shelf for Kleenex Cottonelle® Toilet Paper 702, the share of shelf for Pepsi™ 704 changes from 60 cm in FIG. 7 to 33 cm in FIG. 8. In some examples, an unspecified share of shelf 706 is editable the user to include shares of shelf for different products on the shelf. In some examples, the share of shelf image-based KPI 700 includes an edit button 708 to enable the user to edit the respective shares of shelf of the products. In some examples, the share of shelf image-based KPI 700 includes a back button 710 to return the user to the previous view in the user interface.

Figure 9:
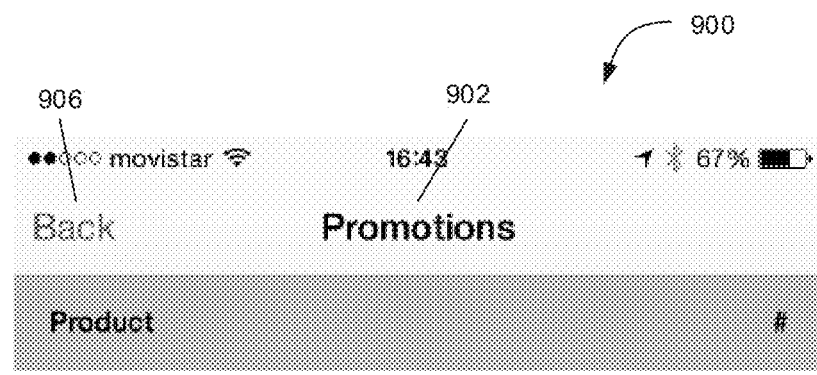

FIG. 9 is an example promotions KPI 900 viewable in an example user interface implemented by the auditing device 102 of FIGS. 1 and/or 2. In some examples, the promotions KPI 900 includes a title 902 to indicate which KPI the user is viewing. In some examples, the promotions KPI 900 includes a list of products 904 for which promotion(s) and/or discount(s) are currently available. In some examples, each product in the list corresponds to an indicator (e.g., a "Yes" or "No") to indicate to the user whether the product is included in a current promotion. In some examples, the promotion KPI 900 includes a back button 906 to return the user to the previous view in the user interface.

Figure 10:
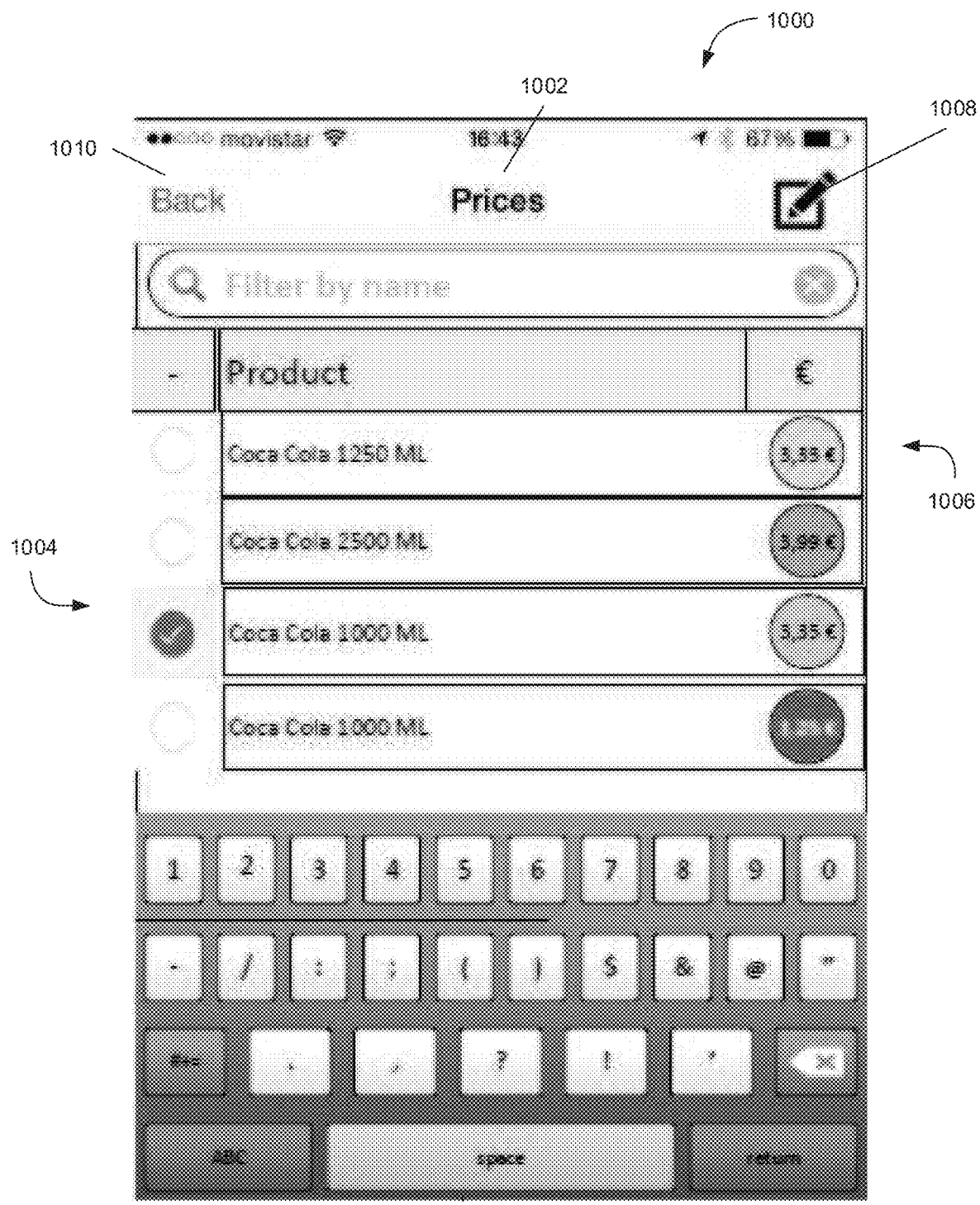

FIG. 10 is an example prices KPI 1000 viewable in an example user interface implemented by the auditing device 102 of FIGS. 1 and/or 2. In some examples, the prices KPI 1000 includes a title 1002 to indicate which KPI the user is viewing. In some examples, the prices KPI 1000 includes a list of products 1004 including a price indication 1006 for each product. In some examples, the prices KPI includes an edit button 1008 to enable the user to edit the prices. In some examples, the prices KPI 1000 includes a back button 1010 to return the user to the previous view in the user interface.

Figure 11:
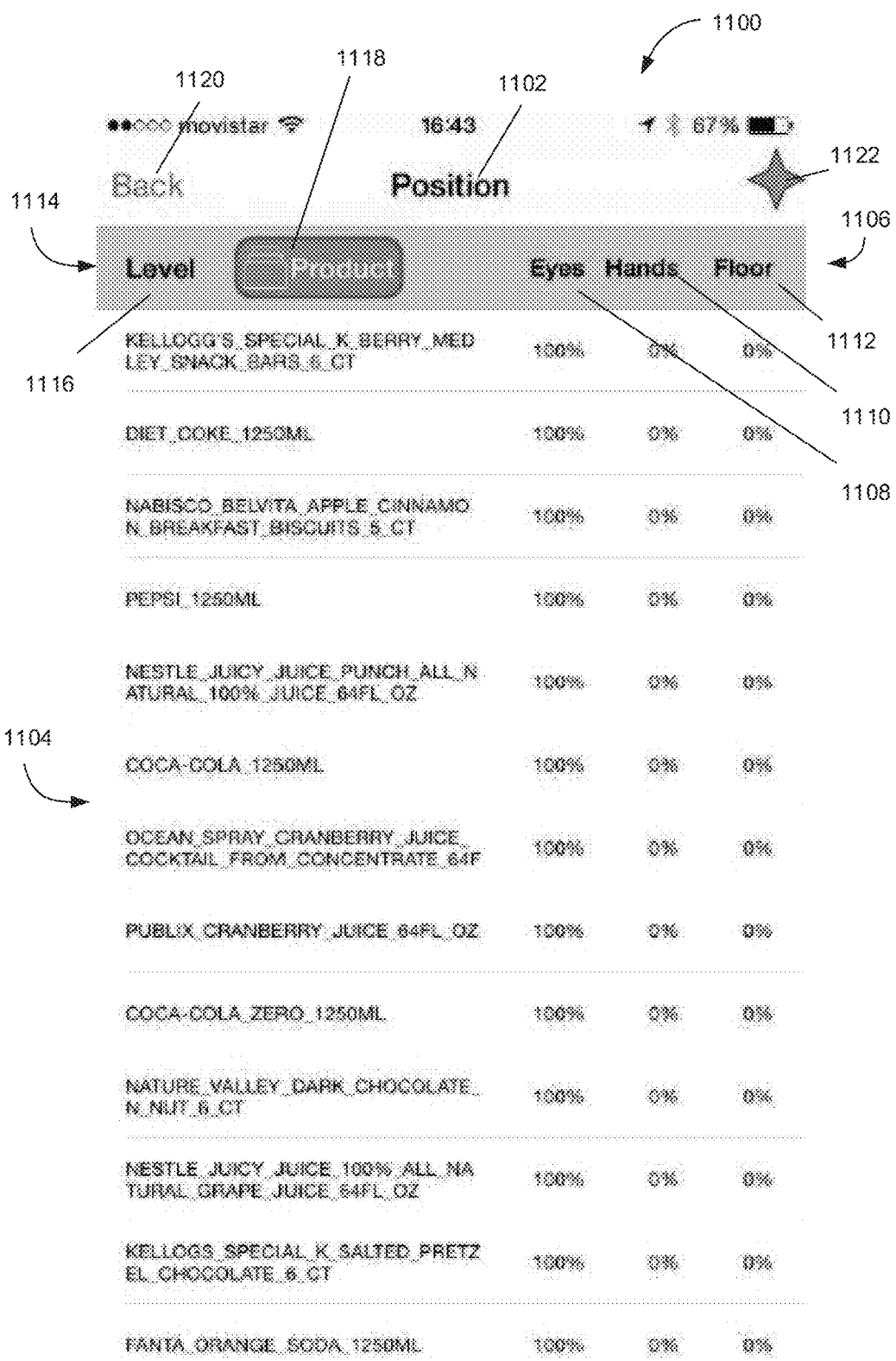
Figure 12:
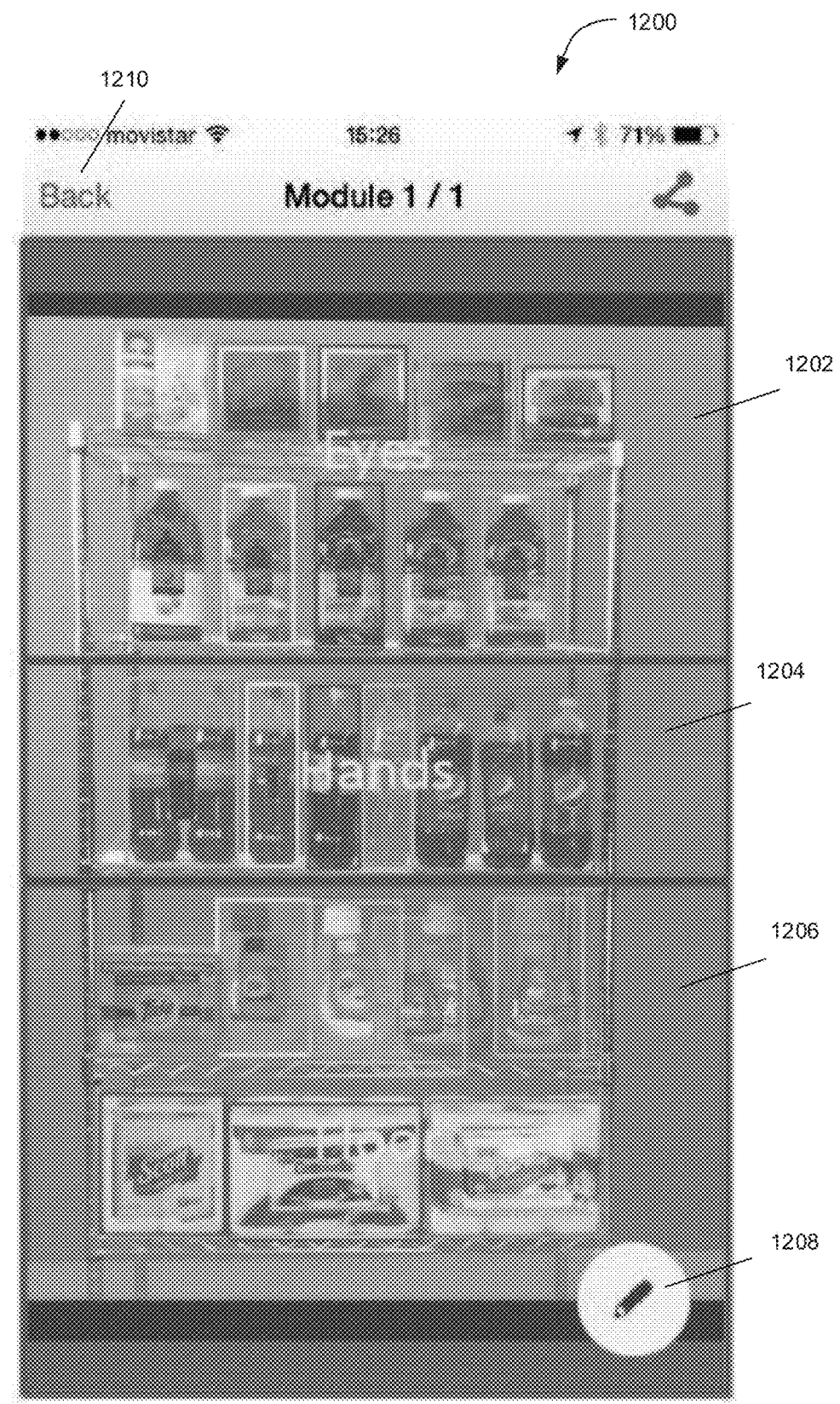

FIG. 11 is an example position KPI 1100 viewable in an example user interface implemented the auditing device 102 of FIGS. 1 and/or 2. In some examples, the position KPI 1100 includes a title 1102 to indicate which KPI the user is viewing. In some examples, the prices KPI 1100 includes a list of products 1104 including a position indication 1106 indicating a position on the product shelf for each product. In some examples, the indicated position includes eyes (e.g., corresponding to an eye-level position, a top-level position, etc.) 1108, hands (e.g., corresponding to a hand-level position, a mid-level position, etc.) 1110, or floor (e.g., corresponding to a floor-level position, a bottom-level position, etc.) 1112, which define different positions of the shelving unit 304. In some examples, the indicated position may include a combination of eyes 1108, hands 1110, or floor 1112. For example, a product on a shelf between an eyes 1108 location and a hands 1110 location may indicate the product is 50% in eyes 1108 and 50% in hands 1110. In some examples, the share of shelf KPI 1100 includes one or more view-switching buttons 1114. In the illustrated example, the view switching buttons 1114 include a level button 1116 and a product button 1118. In some examples, the position KPI 1100 includes a back button 1120 to return the user to the previous view in the user interface. In some examples, the prices KPI 1100 includes an auxiliary button 1122.

FIG. 12 depict an example position image-based KPI 1200 viewable in an example user interface implemented by the auditing device 102 of FIGS. 1 and/or 2. In some examples, the user uses the auxiliary button 1122 of FIG. 11 to view the position image-based KPI 1200. In some examples, the user uses the position image based KPI 1200 to view the position regions including an eyes region 1202, a hands region 1204, and a feet region 1206. In some examples, the user may edit the size and/or locations of the regions 1202, 1204, and 1206. In some such examples, an edit button 1208 enables the user to edit the regions 1202, 1204, and 1206. In some examples, the position image-based KPI 1200 includes a back button 1210 to return the user to the previous view in the user interface.

While an example manner of implementing the auditing device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example processor 202, the example camera 204, the example display, 206, the example I/O interface 208, the example image segmentor 210, the example candidate pattern selector 212, the example product identifier 214, the example KPI definer 216, the example results analyzer 218, the example storage device 220, and/or, more generally, the example auditing device 102 may be implemented by hardware, software, firmware and/or any combination of hardware, software and/or firmware. Thus, for example, any of the example processor 202, the example camera 204, the example display, 206, the example I/O interface 208, the example image segmentor 210, the example candidate pattern selector 212, the example product identifier 214, the example KPI definer 216, the example results analyzer 218, the example storage device 220, and/or, more generally, the example auditing device 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 202, the example camera 204, the example display, 206, the example I/O interface 208, the example image segmentor 210, the example candidate pattern selector 212, the example product identifier 214, the example KPI definer 216, the example results analyzer 218, the example storage device 220, and/or, more generally, the example auditing device 102 is/are hereby expressly defined to include a tangible computer readable storage device or storage disk such as a memory, a digital versatile disk (DVD), a compact disk (CD), a Blu-ray disk, etc. storing the software and/or firmware. Further still, the example auditing device 102 of FIG. 1 may include one or more elements, processes and/or devices in addition to, or instead of, those illustrated in FIG. 2, and/or may include more than one of any or all of the illustrated elements, processes and devices.

Figure 13:
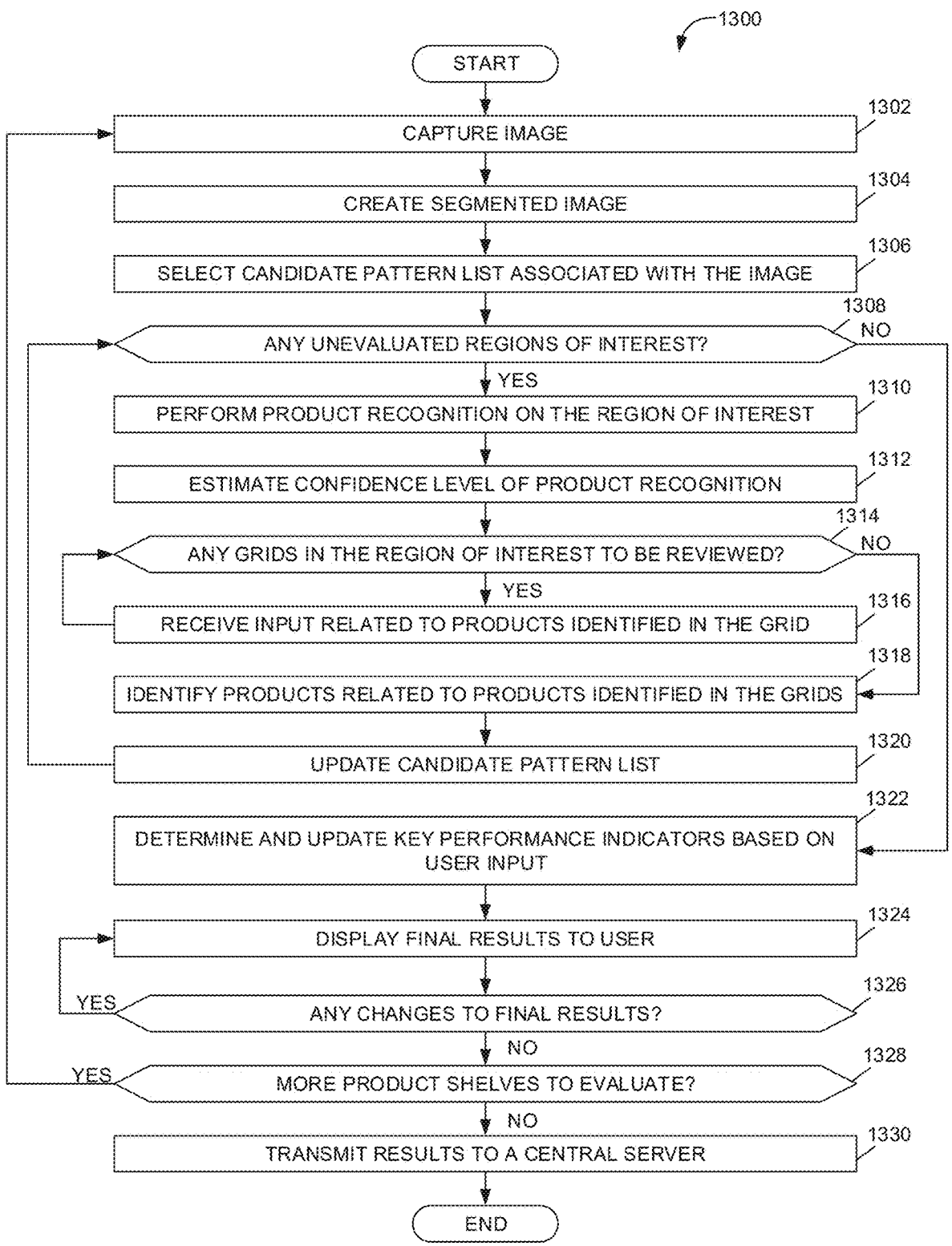
FIG. 13 is a flowchart representative of example machine-readable instructions for interactive product auditing that may be executed by the example auditing device of FIGS. 1 and/or 2.
Figure 14:
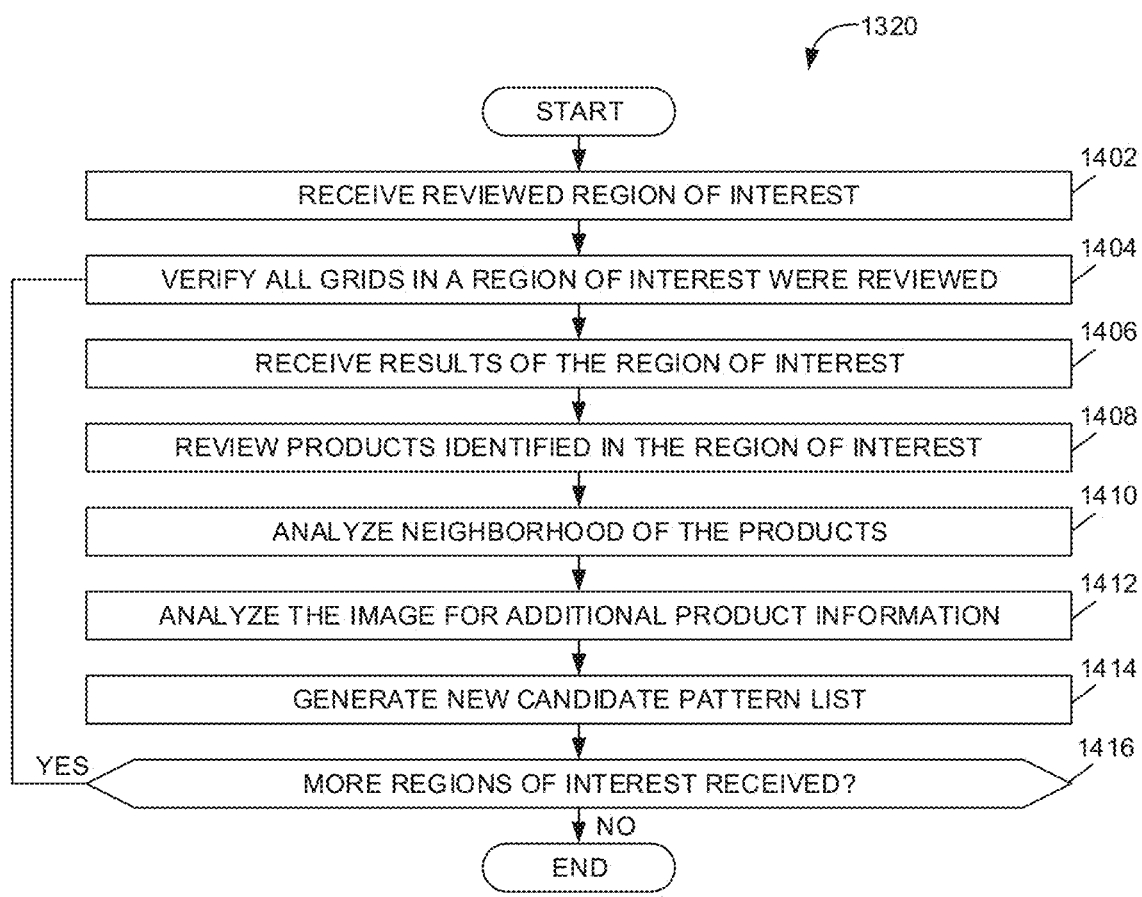
FIG. 14 is a flowchart representative of example machine-readable instructions for updating a candidate pattern list that may be executed by the example auditing device of FIGS. 1 and/or 2.
Figure 15:
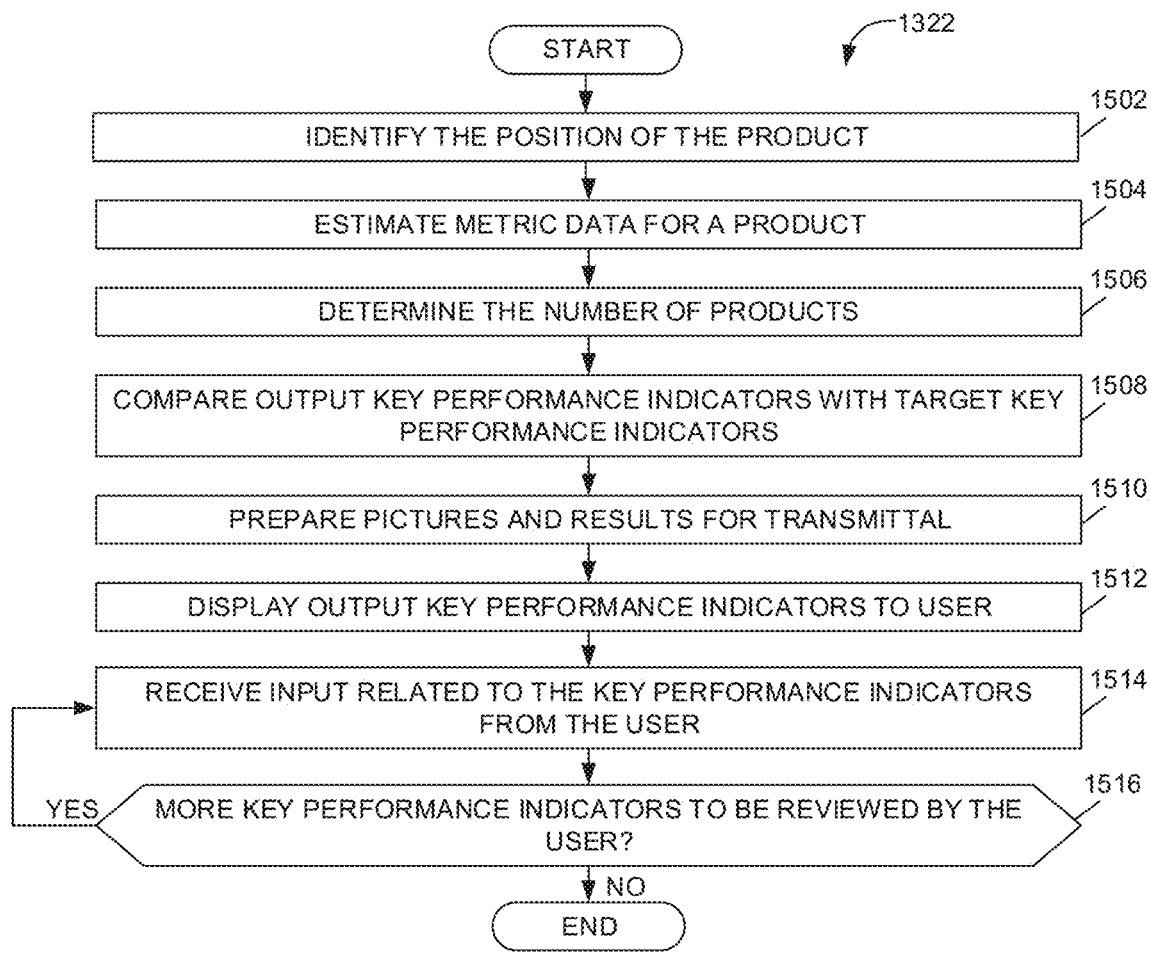
FIG. 15 is a flowchart representative of example machine-readable instructions for updating a key performance indicators that may be executed by the example auditing device of FIGS. 1 and/or 2.

Flowcharts representative of example machine readable instructions for implementing the example auditing device 102 of FIGS. 1 and/or 2 are shown in FIGS. 13-15 In these example, the machine readable instructions comprise a program or programs for execution by a processor such as the processor 1602 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1602, but the entire program or programs and/or parts thereof could alternatively be executed by a device other than the processor 1602 and/or embodied in firmware or dedicated hardware. Further, although the example program is described with reference to the flowchart illustrated in FIGS. 13-15, many other methods of implementing the example auditing device 102 the example processor 202, the example camera 204, the example display, 206, the example I/O interface 208, the example image segmentor 210, the example candidate pattern selector 212, the example product identifier 214, the example KPI definer 216, the example results analyzer 218, and/or the example storage device 220 may alternatively be used. For example, the order of execution of the blocks may be changed, and/or some of the blocks described may be changed, eliminated, or combined.

As mentioned above, the example processes of FIGS. 13-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 13-15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 13 is a flowchart 1300 representative of example machine-readable instructions for interactive product auditing that may be executed by the example auditing device 102 of FIGS. 1 and/or 2. The instructions begin execution with the example camera 204 capturing a point of sale image (block 1302). The example camera 204 transmits the point of sale image to the image segmentor 210 and the image segmentor 210 creates a segmented image from the point of sale image (block 1304). The example candidate pattern selector 212 selects a first set of patterns to be used to evaluate the product shelf (block 1306). The results analyzer 218 determines if any regions of interest of the segmented image have not been evaluated (block 1308). If the results analyzer 218 determines that there are regions of interest that are unevaluated (block 1308), the product identifier 214 uses image recognition to identify products in the region of interest (block 1310). In the illustrated example, the product identifier 214 estimates a confidence level associated with the identified products in the region of interest (block 1312). The example results analyzer 218 determines if any grids in the region of interest are to be reviewed by the user (block 1314). If the results analyzer 218 determines that there are grids to be reviewed by the user (block 1314), the product identifier 214 receives input from the user related to the products identified in the grids (block 1316). If the results analyzer 218 determines that there are no grids to be reviewed by the user, the example candidate pattern selector 212 identifies patterns related to the products identified in the grid (block 1318). The example candidate pattern selector 212 updates the set of patterns to be used during the product audit based on the identified patterns (block 1320). Execution returns to block 1308.

If the results analyzer 218 determines in block 1308 that there are no more regions of interest to be evaluated, the KPI definer 216 determines output KPIs based on the products identified during the shelf audit and updates the output KPIs based on a user input (block 1322). The example results analyzer 218 displays the final results (e.g., the image-based results and/or the KPIs) to the user via the user interface of the auditing device 102 (block 1324). The example results analyzer 218 then determines if the user made any changes to the final results (block 1326). If changes were made to the final results, the instructions return to block 1324. If no changes were made to the final results, the example results analyzer 218 determines if there are more product shelves in the store to evaluate (block 1328). If the results analyzer 218 determines that there are more product shelves to evaluate (block 1326), execution returns to block 1302. If the results analyzer 218 determines that there are no more product shelves in the store to evaluate, the results analyzer 218 transmits the results to the central server 104 (block 1330). Execution of the program of FIG. 13 then ends.

FIG. 14 is a flowchart representative of example machine-readable instructions for updating a candidate pattern list in block 1320 of FIG. 13 and that may be executed by the example auditing device 102 of FIG. 1. The instructions begin execution with the example candidate pattern selector 212 receiving the user input related to a reviewed region of interest (block 1402). The example results analyzer 218 verifies that all grids in the region of interest have been reviewed (block 1404). The example candidate pattern selector 212 receives the results of the region of interest, including an indication of the patterns matched to products in the region of interest (block 1406). The example candidate pattern selector 212 reviews the products identified in the region of interest and the patterns matched to the products (block 1408). The example candidate pattern selector 212 analyzes the neighborhood of the products in the region of interest (block 1410). The candidate pattern selector 212 analyzes the segmented image for additional information (e.g., number of products not analyzed, brand information for identified products, etc.) to be used to update a set of patterns (block 1412). The candidate pattern selector 212 creates a new set of patterns to use to audit the product shelf to replace the first set of patterns used to audit the product shelf (block 1414). The candidate pattern selector 212 determines if more regions of interest have been received (block 1416). If more regions of interest have been received (block 1416), execution returns to block 1404. If no more regions of interest have been received, execution of the program of FIG. 14 ends.

FIG. 15 is a flowchart representative of example machine-readable instructions for updating key performance indicators in block 1322 of FIG. 13 and that may be executed by the example auditing device 102 of FIGS. 1 and/or 2. The instructions begin execution with the example KPI definer 216 identifying the position of the one or more products (block 1502). The example KPI definer 216 estimates metric data (e.g., dimensions of a product, share of shelf of a product) for one or more products (block 1504). The example KPI definer 216 determines a number of products in a region of interest (block 1506). The example KPI definer 216 compares the output KPIs calculated in blocks 1502 to 1506 to target KPIs designated by the user (block 1508). The example results analyzer 218 prepares the results for transmittal to the central server 104 (block 1510). The example KPI definer 216 displays the output KPI(s) to the user via the user interface and modifies the output KPI(s), as appropriate (block 1512). The example KPI definer 216 receives input from the user related to the output KPIs (block 1514). The example results analyzer 218 determines if any KPIs need to be reviewed by the user (block 1516). If the results analyzer 218 determines there are KPIs to be reviewed by the user (block 1516), execution returns to block 1514. In the results analyzer 218 determines there are no more KPIs to be reviewed by the user (block 1615), execution of the program of FIG. 15 ends.

Figure 16:
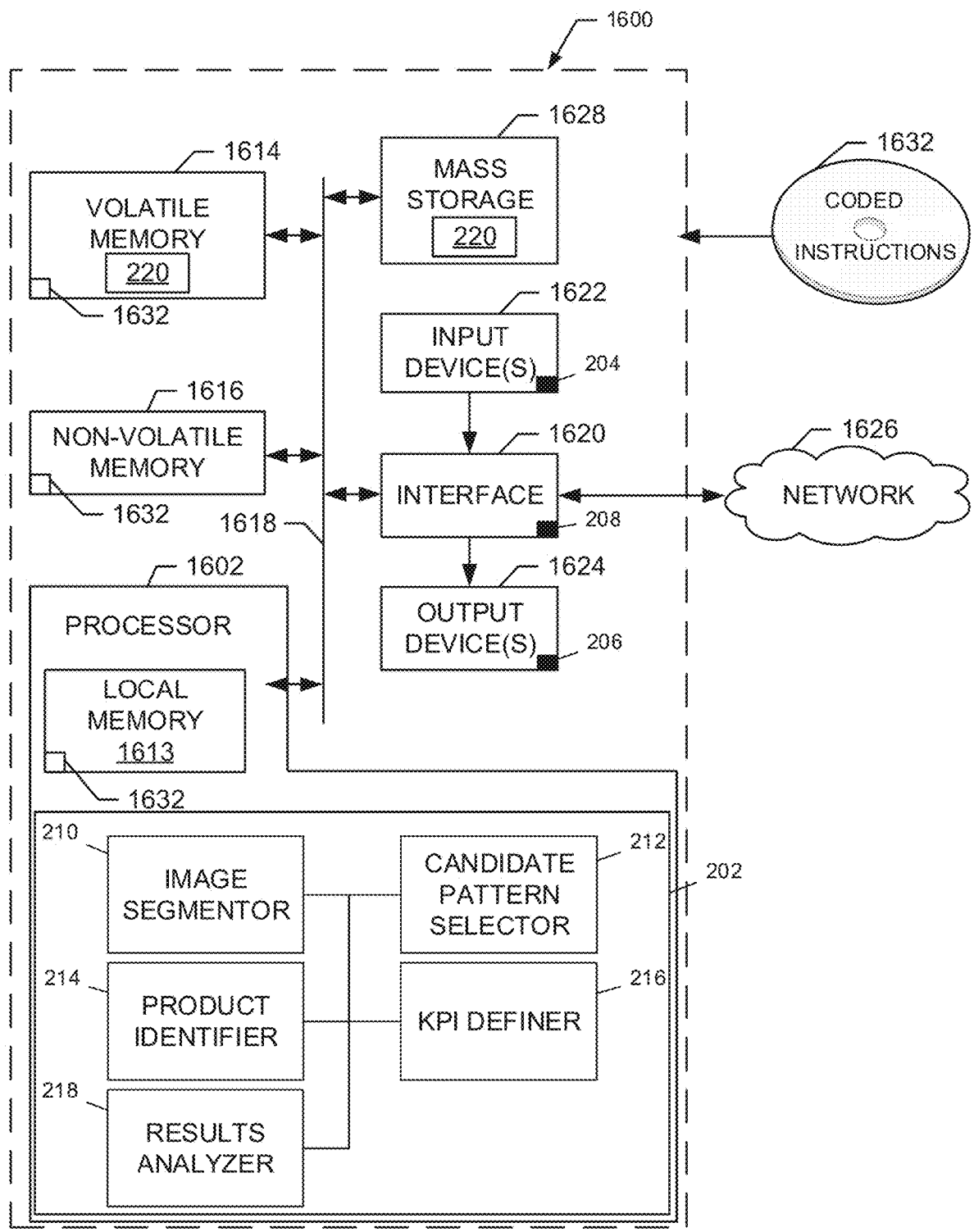
FIG. 16 is a block diagram of an example processor platform structured to execute the example machine-readable instructions of FIGS. 13, 14, and/or 15 implemented by the example auditing device of FIGS. 1 and/or 2.

FIG. 16 is a block diagram of an example processor platform 1600 structured to execute the instructions of FIGS. 13-15 to implement the auditing device 102 of FIGS. 1 and/or 2. The processor platform 1600 can be, for example, a server, a personal computer, a mobile device (e.g., a cell phone, a smart phone, a tablet such as an iPad™), a personal digital assistant (PDA), an Internet appliance, a digital video recorder, a personal video recorder, or any other type of computing device.

The processor platform 1600 of the illustrated example includes a processor 1602. The processor 202 of the illustrated example is hardware. For example, the processor 1602 can be implemented by one or more integrated circuits, logic circuits, microprocessors or controllers from any desired family or manufacturer. In the illustrated example, the processor 1600 executes example instructions 1632 corresponding to the example instructions of FIGS. 13, 14, and/or 15 to implement the example auditing device processor 202, the example image segmentor 210, the example candidate pattern selector 212, the example product identifier 214, the example KPI definer 216, and/or the example results analyzer 218.

The processor 1602 of the illustrated example includes a local memory 1613 (e.g., a cache). The processor 1602 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example, the one or more input device 1622 includes the example camera 204.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor. In the illustrated example, the one or more output device includes the example display 206.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). In the illustrated example, the interface circuit 1620 implements the example I/O interface 208.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives. In some examples, the mass storage device(s) 1628 and/or the volatile memory 1614 implement the example storage device 220.

The coded instructions 1632 of FIGS. 13-15 may be stored in the mass storage device 1628, in the volatile memory 1614, in the non-volatile memory 1616, and/or on a removable tangible computer readable storage medium such as a CD or DVD.

From the foregoing, it will appreciated that the above disclosed example methods, apparatus and articles of manufacture can reduce the overall cost of performing shelf audits by not requiring complex infrastructures to perform the image recognition. Additionally, the example methods, apparatus, and/or articles of manufacture disclosed herein reduce the amount of offline manual intervention required to review and verify the results, which is traditionally very costly. The example methods, apparatus and/or articles of manufacture disclosed herein can also reduce the amount of time between collecting the information and obtaining the final results.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An interactive product auditing method comprising:
    performing, with at least one processor of an auditing device, image recognition on a first segmented image to identify a first product depicted in a first region of interest of the segmented image;
    determining, with the at least one processor of the auditing device, a key performance indicator based on the first region of interest and product information associated with the first product;
    based on a confidence level associated with the key performance indicator not satisfying a threshold associated with the key performance indicator, prompting, with the at least one processor of the auditing device, a user to enter a user input corresponding to the key performance indicator; and
    modifying, with the at least one processor, the key performance indicator based on the user input.

2. The method of claim 1, further including
    displaying the key performance indicator on a display of the auditing device while prompting the user;
    and
    displaying the modified key performance indicator on the display of the auditing device.

3. The method of claim 2, further including transmitting the modified key performance indicator to a central server.

4. The method of claim 1, wherein the key performance indicator is a task to be completed by the user prior to the user completing a store audit, the task to provide second information related to the first product and first region of interest.

5. The method of claim 1, further including modifying the key performance indicator by changing a value related to the first product, wherein the value includes at least one of an assortment, a number of facings, a share of shelf space, or a price.

6. The method of claim 5, further including displaying, via a display of the auditing device, an image-based result including the segmented image and the value related to the first product.

7. The method of claim 1, further including
    identifying, by the at least one processor, a second product in a second region of interest in the segmented image, wherein the key performance indicator is determined at least partially based on the first product and the second product.

8. The method of claim 1, wherein determining the key performance indicator includes at least one of determining a number of instances of the first product in the first region of interest, estimating dimensions of the first product, or identifying a position of the first product in the first region of interest.

9. The method of claim 1, further including:
    comparing the key performance indicator with a target key performance indicator; and
    displaying a result of the comparison on a display of the auditing device.

10. An auditing device comprising:
    a display;
    an input/output interface;
    memory stored in the auditing device;
    instructions; and at least one processor to execute the instructions to:
- perform image recognition on a first segmented image to identify a first product depicted in a first region of interest of the segmented image, and
- determine a key performance indicator based on the first region of interest and product information associated with the first product,
- based on a confidence level associated with the key performance indicator not satisfying a threshold associated with the key performance indicator, prompt a user to enter a user input corresponding to the key performance indicator, and
- modify the key performance indicator based on the user input.

11. The auditing device of claim 10, wherein the at least one processor is to:
- display the key performance indicator on a display of the auditing device while prompting the user; and
- display the modified key performance indicator on the display of the auditing device.

12. The auditing device of claim 11, further including an input/output interface to transmit the modified key performance indicator to a central server.

13. The auditing device of claim 10, wherein the key performance indicator is a task to be completed by the user prior to the user completing a store audit, the task to provide second information related to the first product and first region of interest.

14. The auditing device of claim 10, wherein the at least one processor is to execute the instructions to modify the key performance indicator by changing a value related to the first product, wherein the value includes at least one of an assortment, a number of facings, a share of shelf space, or a price.

15. The auditing device of claim 14, further including a display of the auditing device to display an image-based result including the segmented image and the value related to the first product.

16. The auditing device of claim 10, wherein the at least one processor is to execute the instructions to:
- identify a second product in a second region of interest in the segmented image,
- wherein the key performance indicator is determined at least partially based on the first product and the second product.

17. The auditing device of claim 10, wherein the at least one processor is to execute the instructions to determine the key performance indicator by at least one of determining a number of instances of the first product in the first region of interest, estimating dimensions of the first product, or identifying a position of the first product in the first region of interest.

18. The auditing device of claim 10, wherein the at least one processor is to execute the instructions to:
- compare the key performance indicator with a target key performance indicator; and
- display a result of the comparison on a display of the auditing device.

19. A non-transitory computer readable storage medium comprising instructions that, when executed, cause at least one processor of an auditing device to at least:
- perform image recognition on a first segmented image to identify a first product depicted in a first region of interest of the segmented image;
- determine a key performance indicator based on the first region of interest and product information associated with the first product;
- based on a confidence level associated with the key performance indicator not satisfying a threshold associated with the key performance indicator, prompt a user to enter a user input corresponding to the key performance indicator; and
- modify the key performance indicator based on the user input.

20. The non-transitory computer readable storage medium of claim 19, wherein the instructions, when executed, further cause the at least one processor to:
- display the key performance indicator on a display of the auditing device while prompting the user; and
- display the modified key performance indicator on the display of the auditing device.

21. The non-transitory computer readable storage medium of claim 20, wherein the instructions, when executed, further cause the at least one processor to transmit the modified key performance indicator to a central server.

22. The non-transitory computer readable storage medium of claim 19, wherein the key performance indicator is a task to be completed by the user prior to the user completing a store audit, the task to provide second information related to the first product and first region of interest.

23. The non-transitory computer readable storage medium of claim 19, wherein the instructions, when executed, further cause the at least one processor to modify the key performance indicator by changing a value related to the first product, wherein the value includes at least one of an assortment, a number of facings, a share of shelf space, or a price.

24. The non-transitory computer readable storage medium of claim 23, wherein the instructions, when executed, further cause the at least one processor to display, via a display of the auditing device, an image-based result including the segmented image and the value related to the first product.

25. The non-transitory computer readable storage medium of claim 19, wherein the instructions, when executed, further cause the at least one processor to:
- identify a second product in a second region of interest in the segmented image,
- wherein the key performance indicator is determined at least partially based on the first product and the second product.

26. The non-transitory computer readable storage medium of claim 19, wherein the instructions, when executed, cause the at least one processor to determine the key performance indicator by at least one of determining a number of instances of the first product in the first region of interest, estimating dimensions of the first product, or identifying a position of the first product in the first region of interest.

27. The non-transitory computer readable storage medium of claim 19, wherein the instructions, when executed, further cause the at least one processor to:
- compare the key performance indicator with a target key performance indicator; and
- display a result of the comparison on a display of the auditing device.

* * * * *